(12) United States Patent
Hayakawa et al.

(10) Patent No.: US 8,908,283 B2
(45) Date of Patent: Dec. 9, 2014

(54) OPTICAL SYSTEM, IMAGING APPARATUS, AND METHOD FOR FORMING IMAGE BY THE OPTICAL SYSTEM

(75) Inventors: Satoshi Hayakawa, Ichikawa (JP); Satoru Shibata, Yokohama (JP)

(73) Assignee: Nikon Corporation, Tokyo (JP)

( * ) Notice: Subject to any disclaimer, the term of this patent is extended or adjusted under 35 U.S.C. 154(b) by 975 days.

(21) Appl. No.: 13/005,063

(22) Filed: Jan. 12, 2011

(65) Prior Publication Data

US 2011/0109977 A1    May 12, 2011

Related U.S. Application Data

(63) Continuation of application No. 12/182,195, filed on Jul. 30, 2008, now abandoned.

(30) Foreign Application Priority Data

Aug. 21, 2007    (JP) ................. 2007-215116

(51) Int. Cl.
G02B 15/14    (2006.01)
G02B 15/177    (2006.01)
G02B 27/00    (2006.01)

(52) U.S. Cl.
CPC .......... *G02B 15/177* (2013.01); *G02B 27/0025* (2013.01)
USPC .......................................... 359/676; 359/642

(58) Field of Classification Search
USPC .................... 359/676, 691, 680–682
See application file for complete search history.

(56) References Cited

U.S. PATENT DOCUMENTS

| | | | |
|---|---|---|---|
| 5,381,268 A | 1/1995 | Sato | |
| 5,825,534 A | 10/1998 | Strähle | |
| 6,487,024 B2 | 11/2002 | Sato | |
| 6,972,909 B2 | 12/2005 | Hamano et al. | |
| 6,989,941 B2 | 1/2006 | Tomioka | |
| 7,259,920 B2 | 8/2007 | Sekita | |
| 7,307,795 B2 | 12/2007 | Sekita | |
| 7,382,551 B2 | 6/2008 | Sekita | |
| 7,403,341 B2 | 7/2008 | Watanabe et al. | |
| 7,471,459 B2 | 12/2008 | Hankawa et al. | |
| 7,522,350 B2 | 4/2009 | Nanba | |
| 7,636,202 B2 | 12/2009 | Watanabe et al. | |

(Continued)

FOREIGN PATENT DOCUMENTS

| | | |
|---|---|---|
| CN | 1318765 A | 10/2001 |
| CN | 1971339 A | 5/2007 |

(Continued)

OTHER PUBLICATIONS

Extended European Search Report from counterpart European Divisional Patent Application No. 11158079.1, issued Sep. 19, 2012.

(Continued)

*Primary Examiner* — James Greece
(74) *Attorney, Agent, or Firm* — Miles & Stockbridge P.C.

(57) ABSTRACT

Providing an optical system having excellent optical performance with sufficiently correcting spherical aberration and curvature of field, an imaging apparatus, and a method for forming an image by the optical system. The optical system includes a plurality of lens groups, at least one of the plurality of lens groups having an A lens that satisfies at least one of given conditional expressions.

17 Claims, 21 Drawing Sheets

(56) References Cited

U.S. PATENT DOCUMENTS

| | | |
|---|---|---|
| 2003/0076600 A1 | 4/2003 | Watanabe |
| 2004/0125228 A1 | 7/2004 | Dougherty |
| 2005/0243434 A1 | 11/2005 | Endo |
| 2005/0264896 A1 | 12/2005 | Hoshi |
| 2005/0275947 A1* | 12/2005 | Nishio .................... 359/642 |
| 2006/0285223 A1 | 12/2006 | Watanabe et al. |
| 2007/0103791 A1 | 5/2007 | Hankawa et al. |
| 2007/0121215 A1 | 5/2007 | Sekita |
| 2007/0153387 A1 | 7/2007 | Pawlowski et al. |
| 2008/0165429 A1 | 7/2008 | Nanba |
| 2008/0291548 A1 | 11/2008 | Watanabe et al. |

FOREIGN PATENT DOCUMENTS

| | | | |
|---|---|---|---|
| DE | 10 2005 033 746 A1 | 1/2007 | |
| EP | 1065531 A2 | 1/2001 | |
| EP | 1659422 A1 | 5/2006 | |
| EP | 1 744 188 A | 1/2007 | |
| EP | 1 744 188 A2 | 1/2007 | |
| JP | 8-297244 A | 11/1996 | |
| JP | 2005-134548 | 5/2005 | |
| JP | 2005-134887 | 5/2005 | |
| JP | 2005-134887 A | 5/2005 | |
| JP | 2005-234460 A | 9/2005 | |
| JP | 2005-242014 A | 9/2005 | |
| JP | 2005-338801 A | 12/2005 | |
| JP | 2006-113453 A | 4/2006 | |
| JP | 2007-078801 | 3/2007 | |
| JP | 2007-133133 | 5/2007 | |
| JP | 2007-155836 | 6/2007 | |
| JP | 2008-165143 | 7/2008 | |

OTHER PUBLICATIONS

Schott: "Optisches Glass" Jun. 2000, Mainz, XP002529801.
Partial European Search Report from counterpart European Divisional Patent Application No. 11158079.1 issued Apr. 28, 2011.
Berek, M., "Grundlagen der praktischen Optik," Walter de Gruyter, Berlin, XP-002698562, 1970, pp. 62-71.
Extended European Search Report dated Oct. 7, 2013, in European Patent Application No. 13165428.7.

* cited by examiner

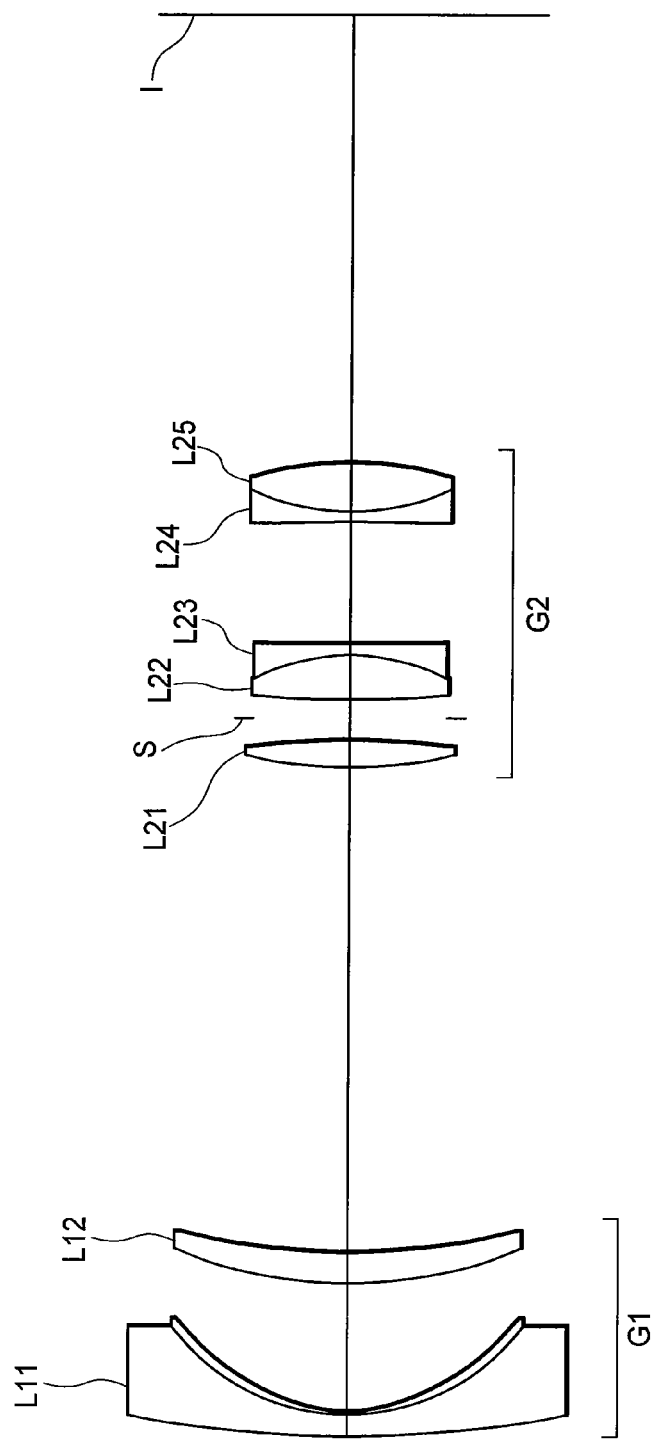

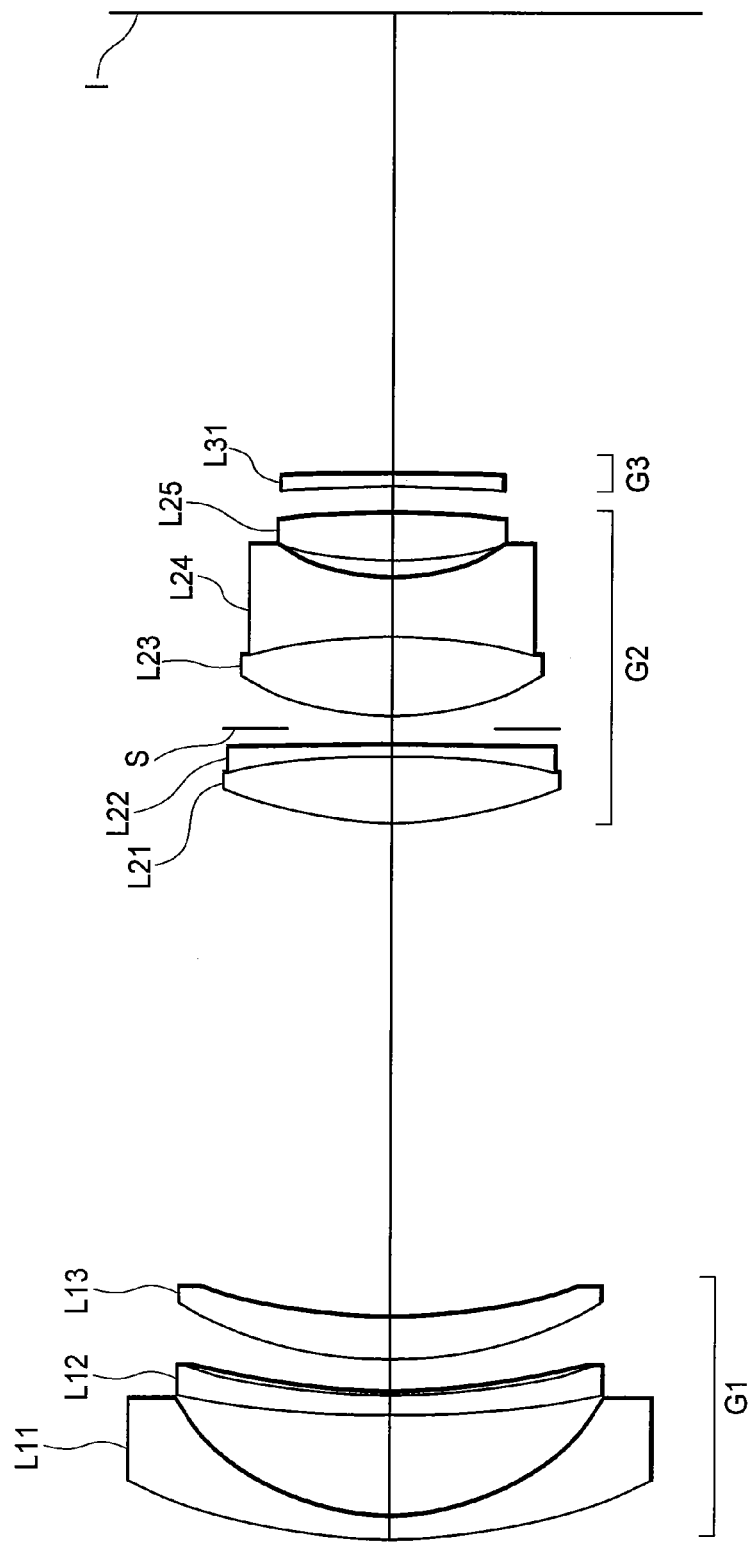

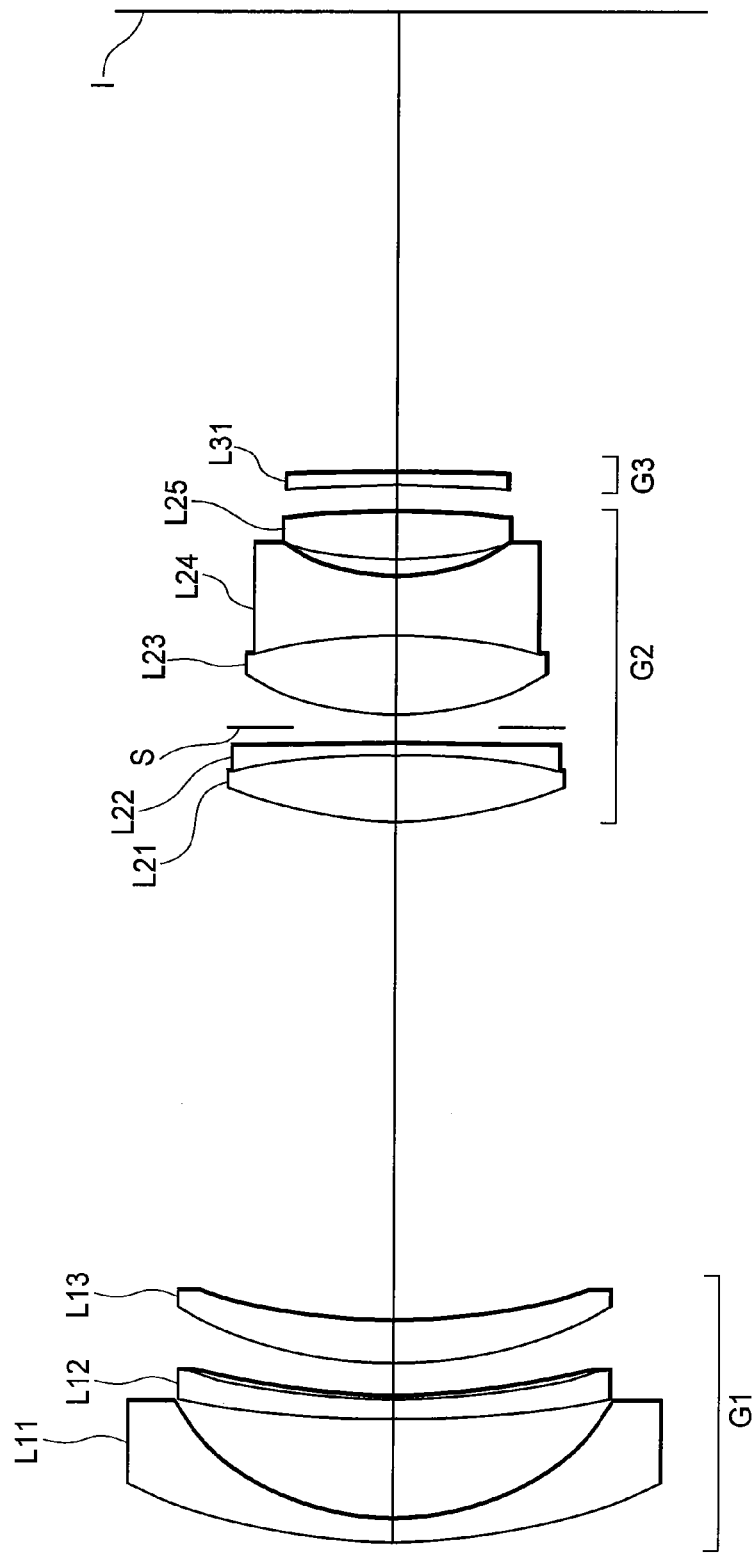

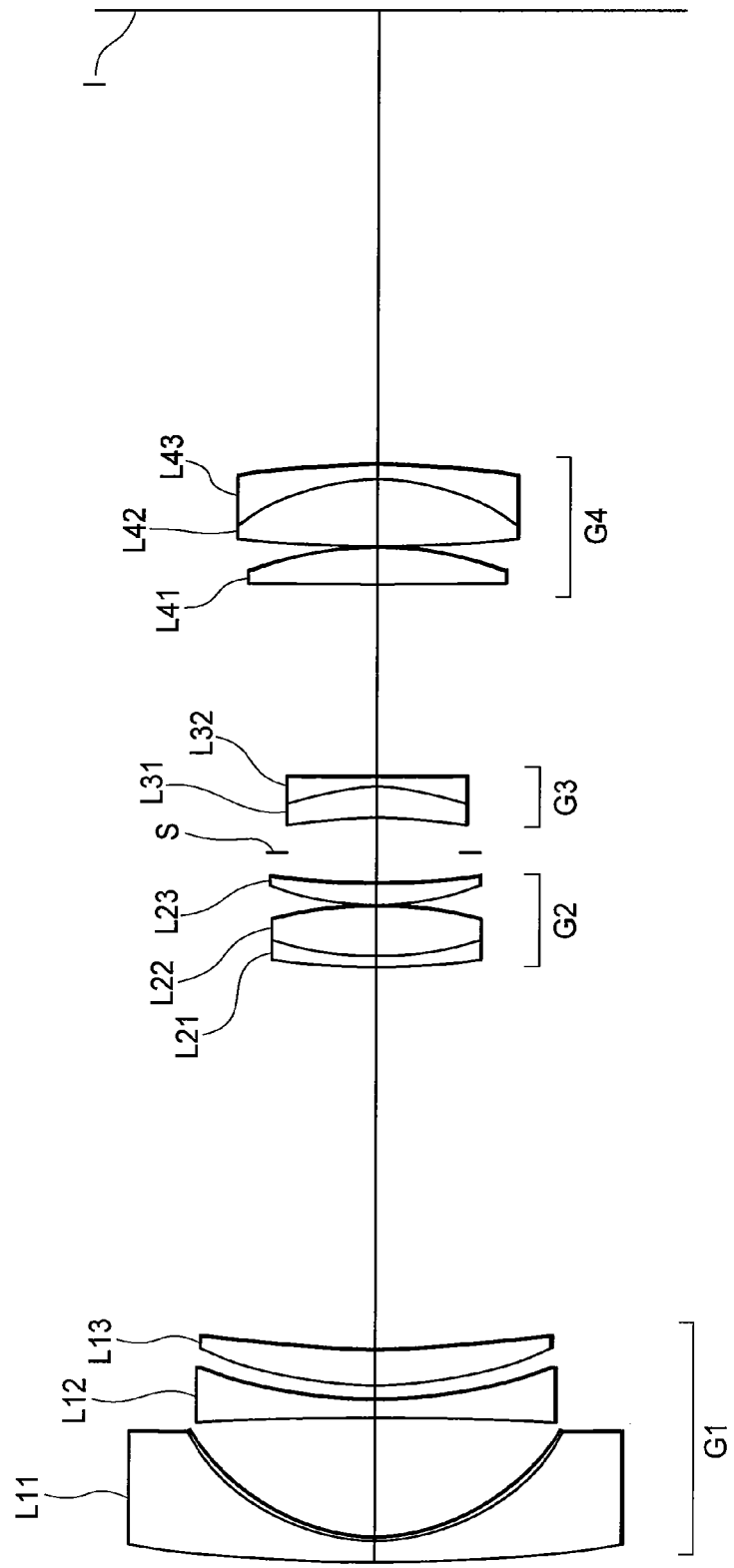

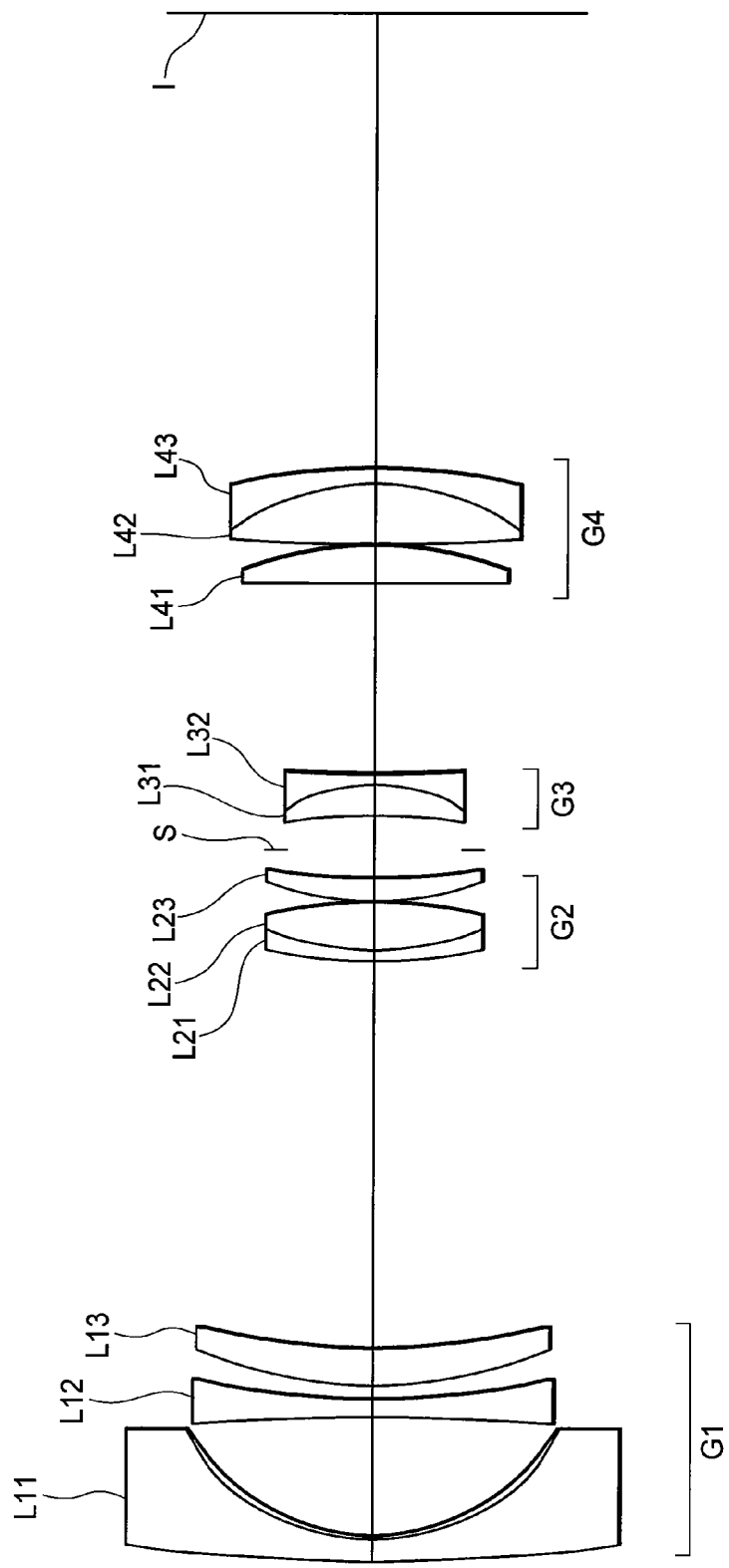

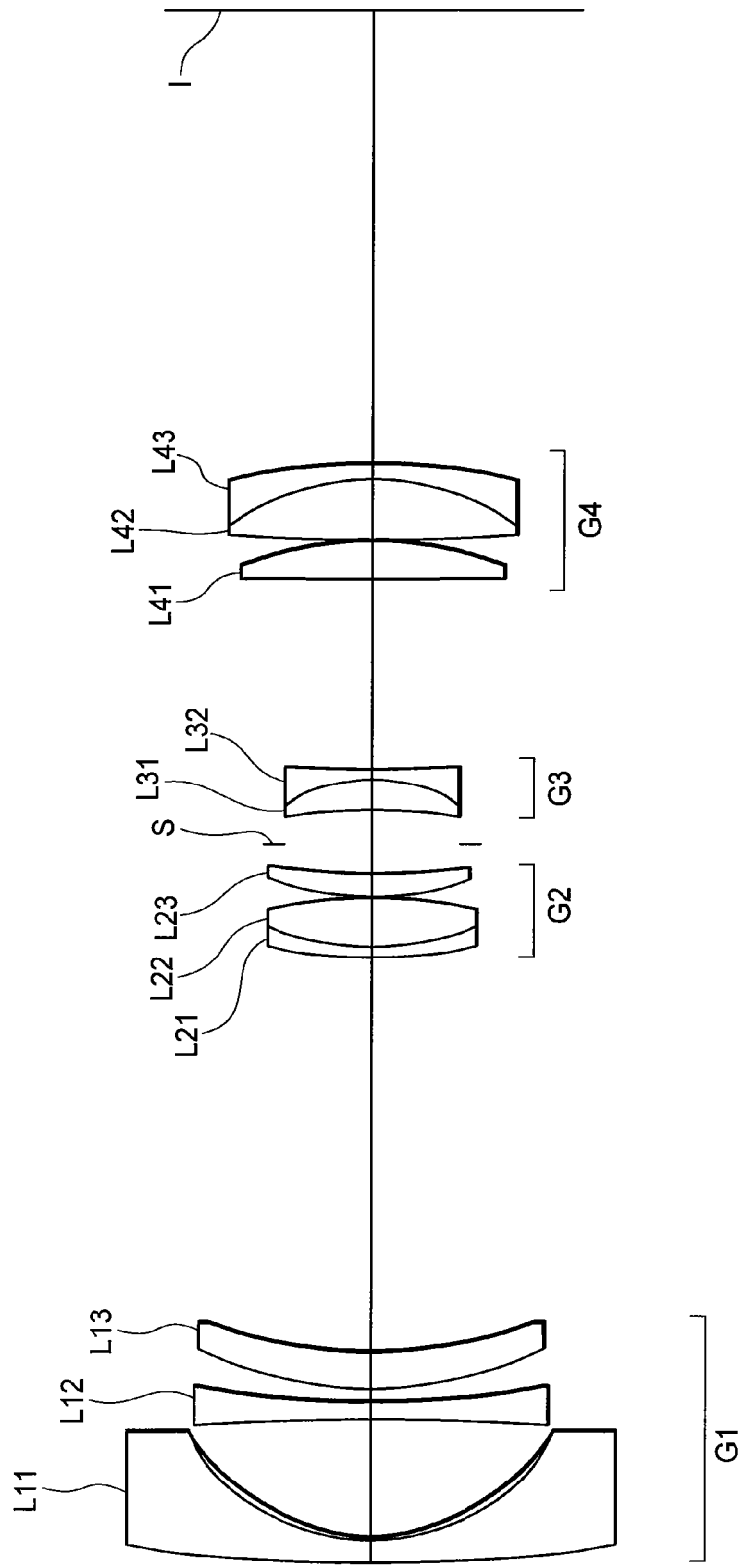

OPTICAL SYSTEM, IMAGING APPARATUS, AND METHOD FOR FORMING IMAGE BY THE OPTICAL SYSTEM

This application is a continuation of Application No. 12/182,195 filed Jul. 30, 2008. Also, the disclosure of the following priority application is herein incorporated by reference:

Japanese Patent Application No. 2007-215116 filed on Aug. 21, 2007.

BACKGROUND OF THE INVENTION

1. Field of the Invention

The present invention relates to an optical system, an imaging apparatus, and a method for forming an image by the optical system.

2. Related Background Art

An optical system having a lens made of a glass medium with a high refractive index has been known. As for such an optical system, there has been proposed a one having a two-lens-group configuration composed of, in order from an object, a negative lens group and a positive lens group such as Japanese Patent Application Laid-Open No. 2005-134887.

Although the conventional optical system has a lens made of a glass medium with a high refractive index, there still has a problem that spherical aberration and curvature of field cannot be sufficiently corrected.

SUMMARY OF THE INVENTION

The present invention has made in view of above described problems and has an object to provide an optical system having excellent optical performance with sufficiently correct spherical aberration and curvature of field, an imaging apparatus, and a method for forming an image by the optical system.

According to a first aspect of the present invention, there is provided an optical system comprising: a plurality of lens groups; at least one of the plurality of lens groups having an A lens that satisfies at least one of the following conditional expressions (1) and (2):

$$1.88900 < nA - 0.00250 \nu A \qquad (1)$$

$$-4.27500 < nA - 0.3375 \nu A \qquad (2)$$

where nA denotes a refractive index of the A lens at d-line in which wavelength $\lambda=587.6$ nm, and $\nu A$ denotes an Abbe number of the A lens at d-line in which wavelength $\lambda=587.6$ nm.

According to a second aspect of the present invention, there is provided an imaging apparatus equipped with the optical system according to the present invention.

According to a third aspect of the present invention, there is provided a method for forming an image of an optical system comprising a step of: providing the optical system including a plurality of lens groups; at least one of the plurality of lens groups having an A lens that satisfies at least one of the following conditional expressions (1) and (2):

$$1.88900 < nA - 0.00250 \nu A \qquad (1)$$

$$-4.27500 < nA - 0.3375 \nu A \qquad (2)$$

where nA denotes a refractive index of the A lens at d-line in which wavelength $\lambda=587.6$ nm, and $\nu A$ denotes an Abbe number of the A lens at d-line in which wavelength $\lambda=587.6$ nm.

The present invention makes it possible to provide an optical system having excellent optical performance with sufficiently correct spherical aberration and curvature of field, an imaging apparatus, and a method for forming an image by the optical system.

BRIEF DESCRIPTION OF THE DRAWINGS

FIG. 1 is a sectional view showing a lens configuration of an optical system according to Example 1 of the present application.

FIGS. 2A, 2B and 2C are graphs showing various aberrations of the optical system according to Example 1 upon focusing on an infinity object, in which FIG. 2A is in a wide-angle end state (f=18.5), FIG. 2B is in an intermediate focal length state (f=35.0), and FIG. 2C is in a telephoto end state (f=53.5).

FIGS. 4A, 4B and 4C are graphs showing various aberrations of the optical system according to Example 2 upon focusing on an infinity object, in which FIG. 4A is in a wide-angle end state (f=18.5), FIG. 4B is in an intermediate focal length state (f=35.0), and FIG. 4C is in a telephoto end state (f=53.5).

FIG. 5 is a sectional view showing a lens configuration of an optical system according to Example 3 of the present application.

FIGS. 6A, 6B and 6C are graphs showing various aberrations of the optical system according to Example 3 upon focusing on an infinity object, in which FIG. 6A is in a wide-angle end state (f=29.0), FIG. 6B is in an intermediate focal length state (f=50.0), and FIG. 6C is in a telephoto end state (f=91.7).

FIG. 7 is a sectional view showing a lens configuration of an optical system according to Example 4 of the present application.

FIGS. 8A, 8B and 8C are graphs showing various aberrations of the optical system according to Example 4 upon focusing on an infinity object, in which FIG. 8A is in a wide-angle end state (f=29.0), FIG. 8B is in an intermediate focal length state (f=50.0), and FIG. 8C is in a telephoto end state (f=91.7).

FIGS. 10A, 10B and 10C are graphs showing various aberrations of the optical system according to Example 5 upon focusing on an infinity object, in which FIG. 10A is in a wide-angle end state (f=18.5), FIG. 10B is in an intermediate focal length state (f=35.3), and FIG. 10C is in a telephoto end state (f=53.4).

FIGS. 12A, 12B and 12C are graphs showing various aberrations of the optical system according to Example 6 upon focusing on an infinity object, in which FIG. 12A is in a wide-angle end state (f=18.5), FIG. 12B is in an intermediate focal length state (f=35.3), and FIG. 12C is in a telephoto end state (f=53.4).

FIG. 13 is a sectional view showing a lens configuration of an optical system according to Example 7 of the present application.

FIGS. 14A, 14B and 14C are graphs showing various aberrations of the optical system according to Example 7 upon focusing on an infinity object, in which FIG. 14A is in a wide-angle end state (f=18.5), FIG. 14B is in an intermediate focal length state (f=35.3), and FIG. 14C is in a telephoto end state (f=53.4).

FIG. 15 is a sectional view showing a lens configuration of an optical system according to Example 8 of the present application.

FIGS. 16A, 16B and 16C are graphs showing various aberrations of the optical system according to Example 8 upon focusing on an infinity object, in which FIG. 16A is in a wide-angle end state (f=18.5), FIG. 16B is in an intermediate focal length state (f=35.2), and FIG. 16C is in a telephoto end state (f=53.4).

FIG. 17 is a sectional view showing a lens configuration of an optical system according to Example 9 of the present application.

FIGS. 18A, 18B and 18C are graphs showing various aberrations of the optical system according to Example 9 upon focusing on an infinity object, in which FIG. 4A is in a wide-angle end state (f=18.5), FIG. 4B is in an intermediate focal length state (f=35.2), and FIG. 4C is in a telephoto end state (f=53.4).

Figure 2A:
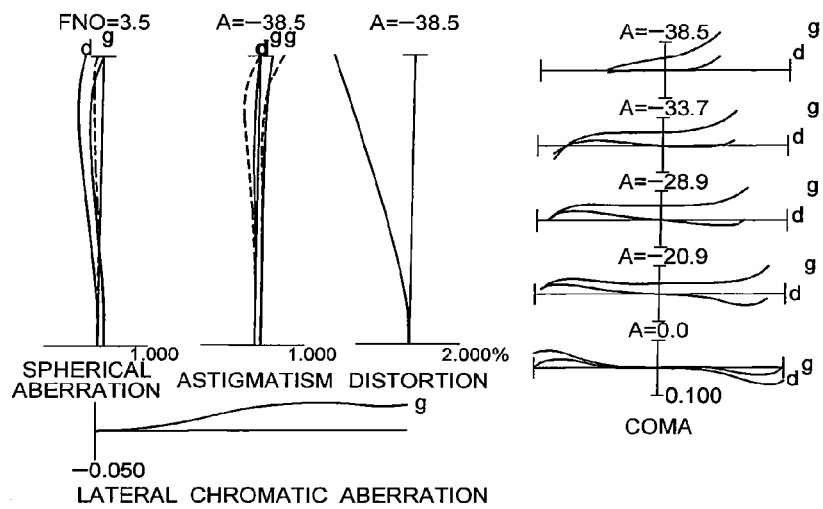

DESCRIPTION OF THE MOST PREFERRED EMBODIMENT An optical system, an imaging apparatus and a method for forming an image by the optical system according to the present application are explained below.

An optical system according to the present application includes a plurality of lens groups, at least one of the plurality of lens groups has an A lens that satisfies at least one of the following conditional expressions (1) and (2):

$$1.88900 < nA - 0.00250\nu A \quad (1)$$

$$-4.27500 < nA - 0.3375\nu A \quad (2)$$

where nA denotes a refractive index of the A lens at d-line in which wavelength λ=587.6 nm, and νA denotes an Abbe number of the A lens at d-line in which wavelength λ=587.6 nm.

An optical system according to the present application has an A lens having a glass material with a high refractive index. By using a glass material with a high refractive index appropriately, the radius of curvature of the A lens can be large, so that it becomes possible to excellently correct various aberrations.

Conditional expression (1) defines an appropriate range of a refractive index of the glass material of the A lens.

When the value nA−0.00250νA is equal to or falls below the lower limit of conditional expression (1), refractive power of the glass material of the A lens becomes small, so that it becomes difficult to sufficiently correct spherical aberration and curvature of field.

In an optical system according to the present application, with satisfying conditional expression (1), it becomes easy to correct aberrations such as spherical aberration and curvature of field, so that excellent optical performance can be secured.

Moreover, when the lower limit of conditional expression (1) is set to 1.89400, refractive power of the A lens becomes further stronger, and the radius of curvature can be larger, so that correction of aberrations becomes easier and excellent optical performance can be secured.

Conditional expression (2) defines an appropriate range of the Abbe number of the glass material of the A lens.

When the value nA−0.3375νA is equal to or falls below the lower limit of conditional expression (2), the Abbe number of the glass material of the A lens becomes large, so that it becomes difficult to sufficiently correct lateral chromatic aberration.

In an optical system according to the present application, with satisfying conditional expression (2), correction of aberrations such as spherical aberration and curvature of field becomes easy, so that it becomes possible to secure excellent optical performance.

Moreover, when the lower limit of conditional expression (2) is set to −4.28000, the Abbe number of the A lens becomes further smaller, so that correction of lateral chromatic aberration becomes easier and excellent optical performance can be secured.

In an optical system according to the present application, it is preferable that the plurality of lens groups include, in order from the most object side, a first lens group having negative refractive power, and a second lens group having positive refractive power.

With this configuration, an optical system according to the present application makes it possible to realize a wide angle of view and makes it easy to correct curvature of field.

In an optical system according to the present application, it is preferable that the plurality of lens groups include, in order from the most object side, a first lens group having negative refractive power, a second lens group having positive refractive power, and a third lens group having negative refractive power.

With this configuration, an optical system according to the present application becomes symmetrical refractive power distribution with respect to the aperture stop, so that it becomes easy to correct distortion.

In an optical system according to the present application, in order to secure excellent optical performance, the A lens preferably satisfies at least one of the following conditional expressions (3) and (4):

$$3.67 < (r2 + r1)/(r2 - r1) \quad (3)$$

$$(r2 + r1)/(r2 - r1) < -2.08 \quad (4)$$

where r1 denotes a radius of curvature of the object side lens surface of the A lens, and r2 denotes a radius of curvature of the image side lens surface of the A lens.

Conditional expressions (3) and (4) show a shape factor of the A lens in an optical system according to the present application and define an appropriate range of the shape factor of the A lens.

In an optical system according to the present application, when the value (r2+r1)/(r2−r1) is equal to or falls below the lower limit of conditional expression (3), the radius of curvature of the image side lens surface of the A lens becomes large and close to a plane surface. When the image side surface of the A lens is close to a plane surface, since an incident angle of an oblique ray not parallel to the optical axis onto the image side surface of the A lens becomes away from the normal, aberrations produced on the surface become large, so that it becomes difficult to sufficiently correct curvature of field.

In an optical system according to the present application, with satisfying conditional expression (3), correction of aberrations such as spherical aberration and curvature of field becomes easy, so that excellent optical performance can be secured.

Moreover, when the lower limit of conditional expression (3) is set to 3.70, correction of curvature of field becomes easier and excellent optical performance can be secured.

In an optical system according to the present application, when the value (r2+r1)/(r2−r1) is equal to or exceeds the upper limit of conditional expression (4), the radius of curvature of the image side surface of the A lens becomes relatively small. When the radius of curvature of the image side surface of the A lens becomes relatively small, since difference from the radius of curvature of the object side surface of the A lens becomes large, aberrations generated on the object side surface of the A lens becomes difficult to be corrected by the image side surface of the A lens, so that it becomes difficult to sufficiently correct curvature of field.

In an optical system according to the present application, with satisfying conditional expression (4), correction of aberrations such as spherical aberration and curvature of field becomes easy, so that excellent optical performance can be secured.

When the upper limit of conditional expression (4) is set to −2.15, correction of curvature of field becomes easier, and excellent optical performance can be secured.

In an optical system according to the present application, in order to secure excellent optical performance, the A lens preferably satisfies the following conditional expression (5):

$$-4.50 < fA/fG < -0.10 \quad (5)$$

where fA denotes a focal length of the A lens, and fG denotes a focal length of the lens group in which the A lens is included.

conditional expression (5) defines an appropriate range of a ratio of the focal length of the A lens to that of the lens group in which the A lens is included.

When the ratio fA/fG is equal to or falls below the lower limit of conditional expression (5), an absolute value of fA becomes relatively large, and refractive power of the A lens becomes small, so that it becomes impossible to sufficiently correct spherical aberration.

When the lower limit of conditional expression (5) is set to −4.30, correction of spherical aberration becomes easy, and excellent optical performance can be secured.

On the other hand, when the ratio fA/fG is equal to or exceeds the upper limit of conditional expression (5), an absolute value of fG becomes relatively large, and refractive power of the A lens becomes weak, so that it becomes difficult to sufficiently correct curvature of field.

When the upper limit of conditional expression (5) is set to −0.30, correction of curvature of field becomes easy, and excellent optical performance can be secured.

In an optical system according to the present application, with satisfying conditional expression (5), correction of aberrations such as spherical aberration and curvature of field becomes easy, so that excellent optical performance can be secured.

In an optical system according to the present application, the A lens preferably has positive refractive power.

With this configuration in an optical system according to the present application, refractive power of the positive lens becomes strong, so that aberrations generated in the positive lens such as spherical aberration can be excellently corrected.

In an optical system according to the present application, it is preferable that the optical system includes an aperture stop, and the A lens is disposed to the object side of the aperture stop and has a convex surface facing the object.

With this configuration, an optical system according to the present application can make smaller an angle of deviation of the ray incident on the convex surface, so that correction of curvature of field becomes easy.

In an optical system according to the present application, it is preferable that the optical system includes an aperture stop, and the A lens is disposed to the image side of the aperture stop and has a concave surface facing the object.

With this configuration, an optical system according to the present application can make smaller an angle of deviation of the ray incident on the concave surface, so that correction of curvature of field becomes easy.

In an optical system according to the present application, among the plurality of lens groups, the lens group in which the A lens is included preferably has negative refractive power.

With this configuration, an optical system according to the present application makes it possible to excellently correct spherical aberration when the lens group including the A lens is disposed near to the aperture stop, or coma when the lens group including the A lens is disposed far from the aperture stop.

In an optical system according to the present application, the most object side lens group among the plurality of lens groups preferably has an aspherical lens.

With this configuration, an optical system according to the present application makes it possible to realize a wide angle of view and to easily correct curvature of field.

In an optical system according to the present application, it is preferable that varying a focal length from a wide-angle end state to a telephoto end state is carried out by varying each distance between the plurality of lens groups.

With this configuration, an optical system according to the present application makes it possible to easily vary a focal length, and to excellently correct curvature of field and spherical aberration over entire focal length range from the wide-angle end state to the telephoto end state.

An imaging apparatus according to the present application is equipped with the above-described optical system.

Accordingly, it becomes possible to realize an imaging apparatus having excellent optical performance with sufficiently correcting spherical aberration and curvature of field.

In a method for forming an image of an optical system according to the present application comprising a step of: providing the optical system including a plurality of lens groups; at least one of the plurality of lens groups having an A lens that satisfies at least one of the following conditional expressions (1) and (2):

$$1.88900 < nA - 0.00250 vA \quad (1)$$

$$-4.27500 < nA - 0.3375 vA \quad (2)$$

where nA denotes a refractive index of the A lens at d-line in which wavelength λ=587.6 nm, and vA denotes an Abbe number of the A lens at d-line in which wavelength λ=587.6 nm.

With this configuration, it becomes possible to realize an optical system having excellent optical performance with sufficiently correcting spherical aberration and curvature of field.

An optical system according to each numerical example of the present application is explained below with reference to accompanying drawings.

EXAMPLE 1

FIG. 1 is a sectional view showing a lens configuration of an optical system according to Example 1 of the present application.

The optical system according to Example 1 is composed of, in order from an object, a first lens group G1 having negative refractive power, and a second lens group G2 having positive refractive power. The first lens group G1 is composed of, in order from the object, a negative meniscus lens L11 having a convex surface facing the object, and a positive meniscus lens L12 having a convex surface facing the object. The negative meniscus lens L11 is an aspherical lens that a resin layer is applied on an image side glass surface and formed an aspherical surface thereon.

The second lens group G2 is composed of, in order from the object, a double convex positive lens L21, a cemented lens constructed by a double convex positive lens L22 cemented with a double concave negative lens L23, and a cemented lens constructed by a double concave negative lens L24 cemented with a double convex positive lens L25.

With this configuration, an air space between the first lens group G1 and the second lens group G2 is varied upon varying a focal length from the wide-angle end state to the telephoto end state.

In the optical system according to Example 1, an aperture stop S is disposed in the second lens group G2, and moved together with the second lens group G2 upon varying a focal length from the wide-angle end state to the telephoto end state.

In the optical system according to Example 1, focusing from an infinity object to a close object is carried out by moving the first lens group G1.

In the optical system according to Example 1, the positive meniscus lens L12 in the first lens group G1 is an A lens. Since the A lens is disposed to the object side of the aperture stop S, the A lens has a positive meniscus shape having a convex surface facing the object, so that an incident angle of an oblique ray not parallel to the optical axis onto the A lens becomes close to the normal.

Various values associated with the optical system according to Example 1 are listed in Table 1.

In Table 1, f denotes a focal length, and Bf denotes a back focal length.

In [Lens Data], the left most column "i" shows the lens surface number counted in order from the object side, the second column "r" shows a radius of curvature of the lens surface, the third column "d" shows a distance to the next surface, the fourth column "nd" shows a refractive index of a material at d-line (wavelength λ=2587.6 nm), and the fifth column "vd" shows an Abbe number of the material at d-line (wavelength λ=587.6 nm). In the fourth column "nd" refractive index of the air nd=1.000000 is omitted. In the second column "r", r=∞ denotes a plane surface. In the third column "d", Bf denotes a back focal length. The position of an aspherical surface is expressed by attaching "*" to the right side of the surface number.

In [Aspherical Data], an aspherical surface is exhibited by the following expression:

$$x=(y^2/r)/[1+[1-\kappa(y/r)^2]^{1/2}]+A3\times|y|^3+A4xy^4+A6xy^6+A8xy^8+A10xy^{10}+A12xy^{12}$$

where y denotes a vertical height from the optical axis, x denotes a sag amount which is a distance along the optical axis from the tangent surface at the vertex of the aspherical surface to the aspherical surface at the vertical height h from the optical axis, r denotes a radius of curvature of a reference sphere (a paraxial radius of curvature), κ denotes a conical coefficient, An denotes aspherical coefficient of n-th order, "E-n" denotes "×10$^{-n}$", for example, "1.234E-5" denotes "1.234×10$^{-5}$".

In [Specifications], FNO denotes an f-number, 2ω denotes an angle of view in degrees, Y denotes an image height, TL denotes a total lens length, W denotes a wide-angle end state, M denotes an intermediate focal length state, T denotes a telephoto end state.

In [Variable Distances], di denotes a variable distance at the surface number i where i is an integer.

In [Lens Group Data], a starting surface number "i" and a focal length of each lens group are shown. In [Values for Conditional Expressions], respective values with respect to conditional expressions are shown.

In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

TABLE 1

[Lens Data]

| i | r | d | nd | vd |
|---|---|---|---|---|
| 1 | 82.7116 | 2.00 | 1.88300 | 40.8 |
| 2 | 17.5800 | 0.20 | 1.55389 | 38.1 |
| 3* | 12.6532 | 11.55 | | |
| 4 | 33.2422 | 2.80 | 2.14352 | 17.8 |
| 5 | 51.5817 | d5 | | |
| 6 | 29.8617 | 2.50 | 1.49782 | 82.6 |
| 7 | −64.4330 | 2.00 | | |
| 8 | ∞ | 1.80 | | Aperture Stop S |
| 9 | 73.9122 | 4.10 | 1.65160 | 58.5 |
| 10 | −15.5658 | 1.00 | 1.77250 | 49.6 |
| 11 | 210.7172 | 11.20 | | |
| 12 | −522.2353 | 0.90 | 1.83400 | 37.2 |
| 13 | 16.9886 | 4.50 | 1.62041 | 60.3 |
| 14 | −27.1583 | Bf | | |

[Aspherical Data]
Surface Number: 3

| κ = | +0.0841 |
|---|---|
| A3 = | −7.4262E−06 |
| A4 = | +6.0257E−06 |
| A6 = | −2.7752E−08 |
| A8 = | +4.1500E−11 |
| A10 = | −1.5448E−13 |
| A12 = | +0.0000 |

[Specifications]
Zoom Ratio: 2.89

| | W | M | T |
|---|---|---|---|
| f | 18.5 | 35.0 | 53.5 |
| FNO | 3.5 | 4.5 | 5.8 |
| 2ω | 77.0 | 44.5 | 29.9 |
| Y | 14.25 | 14.25 | 14.25 |
| TL | 129.08 | 118.47 | 128.93 |
| Bf | 40.38 | 60.25 | 82.53 |

[Variable Distances]

| | W | M | T |
|---|---|---|---|
| d5 | 44.15 | 13.67 | 1.86 |
| d14(Bf) | 40.38 | 60.25 | 82.53 |

[Lens Group Data]

| Group | i | focal length |
|---|---|---|
| 1 | 1 | −31.51 |

TABLE 1-continued

| 2 | 6 | 37.95 |
|---|---|-------|

[Values for Conditional Expressions: (L12)]

| | |
|---|---|
| (1): nA − 0.00250vA = | 2.09910 |
| (2): nA − 0.33750vA = | −3.85385 |
| (3): (r2 + r1)/(r2 − r1) = | 4.63 |
| (4): (r2 + r1)/(r2 − r1) = | 4.63 |
| (5): fA/fG = | −2.40 |

Figure 2B:
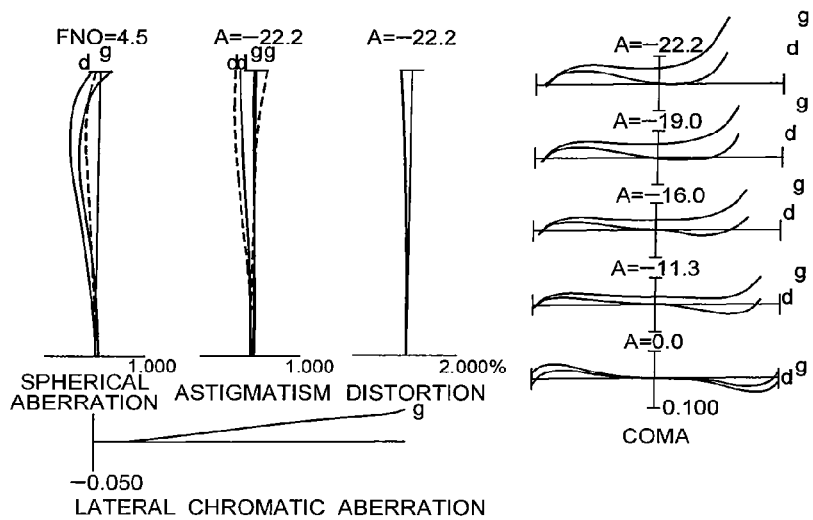
Figure 2C:
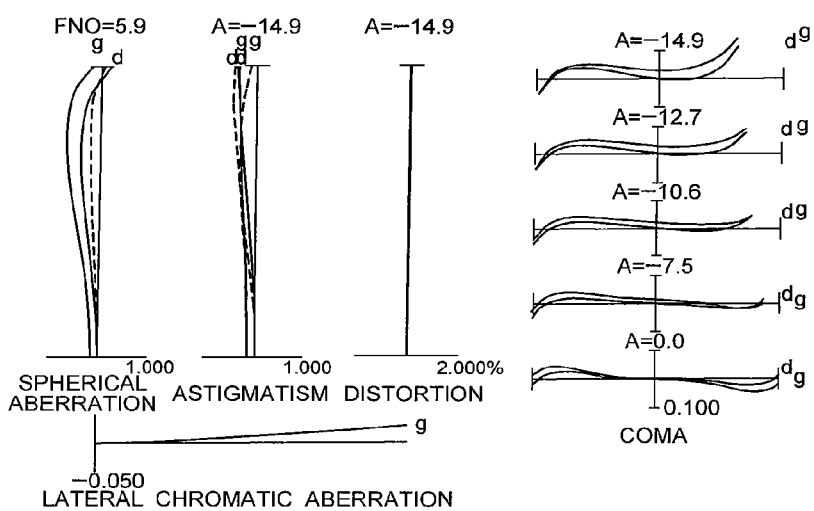

FIGS. 2A, 2B and 2C are graphs showing various aberrations of the optical system according to Example 1 upon focusing on infinity, in which FIG. 2A is in amide-angle end state (f=18.5), FIG. 2B is in an intermediate focal length state (f=35.0), and FIG. 2C is in a telephoto end state (f=53.5).

In respective graphs, FNO denotes an f-number, and A denotes a half angle of view. In graphs showing spherical aberration, f-number with respect to the maximum aperture is shown. In graphs showing astigmatism and distortion, the maximum value of a half angle of view is shown. In graphs showing coma, coma with respect to each half angle of view is shown. In respective graphs, d denotes aberration curve at d-line (wavelength λ=587.6 nm), and g denotes aberration curve at g-line (wavelength λ=435.8 nm). In graphs showing astigmatism, a solid line indicates a sagittal image plane, and a broken line indicates a meridional image plane. The above-described explanation regarding various aberration graphs is the same as the other Examples.

As is apparent from the respective graphs, the optical system according to Example 1 shows superb optical performance as a result of good corrections to various aberrations in the wide-angle end state, in the intermediate focal length state, and in the telephoto end state.

EXAMPLE 2

Figure 3:
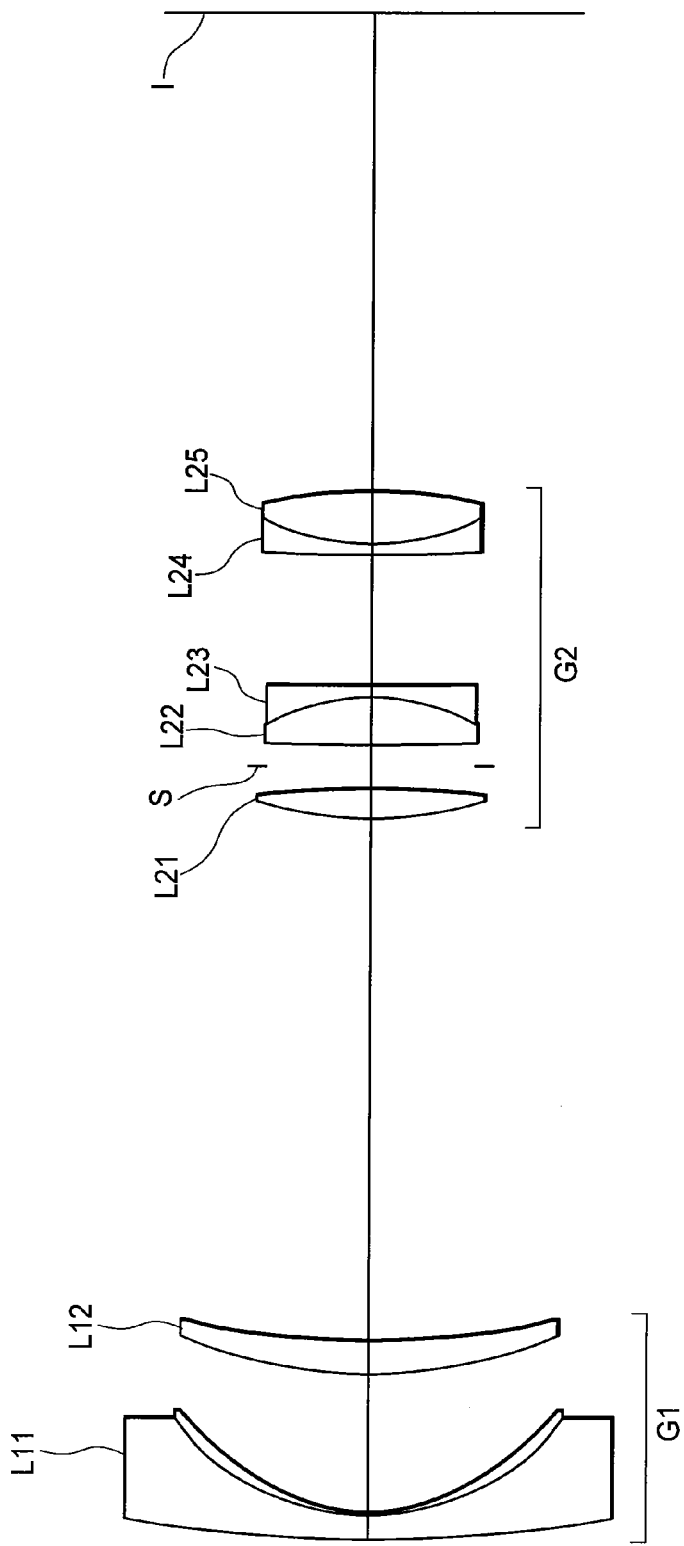
FIG. 3 is a sectional view showing a lens configuration of an optical system according to Example 2 of the present application.

FIG. 3 is a sectional view showing a lens configuration of an optical system according to Example 2 of the present application.

The optical system according to Example 2 is composed of, in order from an object, a first lens group G1 having negative refractive power, and a second lens group G2 having positive refractive power.

The first lens group G1 is composed of, in order from the object, a negative meniscus lens L11 having a convex surface facing the object, and a positive meniscus lens L12 having a convex surface facing the object. The negative meniscus lens L11 is an aspherical lens that a resin layer is applied on an image side glass surface and formed an aspherical surface thereon.

The second lens group G2 is composed of, in order from the object, a double convex positive lens L21, a cemented lens constructed by a double convex positive lens L22 cemented with a double concave negative lens L23, and a cemented lens constructed by a negative meniscus lens L24 having a convex surface facing the object cemented with a double convex positive lens L25.

With this configuration, an air space between the first lens group G1 and the second lens group G2 is varied upon varying a focal length from the wide-angle end state to the telephoto end state.

In the optical system according to Example 2, an aperture stop S is disposed in the second lens group G2, and moved together with the second lens group G2 upon varying a focal length from the wide-angle end state to the telephoto end state.

In the optical system according to Example 2, focusing from an infinity object to a close object is carried out by moving the first lens group G1.

In the optical system according to Example 2, the positive meniscus lens L12 in the first lens group G1 is an A lens. Since the A lens is disposed to the object side of the aperture stop S, the A lens has a positive meniscus shape having a convex surface facing the object, so that an incident angle of an oblique ray not parallel to the optical axis onto the A lens becomes close to the normal.

Various values associated with the optical system according to Example 2 are listed in Table 2.

TABLE 2

[Lens Data]

| i | r | d | nd | vd |
|---|---|---|-----|-----|
| 1 | 97.9612 | 2.00 | 1.81600 | 46.6 |
| 2 | 17.5800 | 0.20 | 1.55389 | 38.1 |
| 3* | 12.6532 | 11.55 | | |
| 4 | 33.3981 | 2.80 | 1.94595 | 18.0 |
| 5 | 56.7142 | d5 | | |
| 6 | 25.0493 | 2.50 | 1.49782 | 82.6 |
| 7 | −75.9580 | 2.00 | | |
| 8 | ∞ | 1.80 | Aperture Stop S | |
| 9 | 160.3175 | 4.10 | 1.65160 | 58.5 |
| 10 | −14.4571 | 1.00 | 1.77250 | 49.6 |
| 11 | 366.8344 | 11.20 | | |
| 12 | 123.6295 | 0.90 | 1.83400 | 37.2 |
| 13 | 16.2628 | 4.50 | 1.60311 | 60.7 |
| 14 | −32.9952 | Bf | | |

[Aspherical Data]
Surface Number: 3

| | |
|---|---|
| κ = | +0.0856 |
| A3 = | −7.2738E−06 |
| A4 = | +5.9947E−06 |
| A6 = | −2.6718E−08 |
| A8 = | +1.3725E−11 |
| A10 = | −2.5203E−14 |
| A12 = | +0.0000 |

| | W | M | T |
|---|---|---|---|

[Specifications]
Zoom Ratio: 2.89

| | | | |
|---|---|---|---|
| f | 18.5 | 35.0 | 53.5 |
| FNO | 3.5 | 4.5 | 5.8 |
| 2ω | 76.7 | 44.5 | 29.9 |
| Y | 14.25 | 14.25 | 14.25 |
| TL | 129.13 | 118.52 | 128.98 |
| BF | 40.43 | 60.30 | 82.58 |

[Variable Distances]

| | | | |
|---|---|---|---|
| d5 | 44.15 | 13.67 | 1.86 |
| d14(Bf) | 40.43 | 60.30 | 82.58 |

[Lens Group Data]

| Group | i | focal length |
|-------|---|--------------|
| 1 | 1 | −31.51 |
| 2 | 6 | 37.95 |

[Values for Conditional Expressions: (L12)]

| | |
|---|---|
| (1): nA − 0.00250vA = | 1.90100 |
| (2): nA − 0.33750vA = | −4.12230 |
| (3): (r2 + r1)/(r2 − r1) = | 3.86 |
| (4): (r2 + r1)/(r2 − r1) = | 3.86 |
| (5): fA/fG = | −2.57 |

Figure 4A:
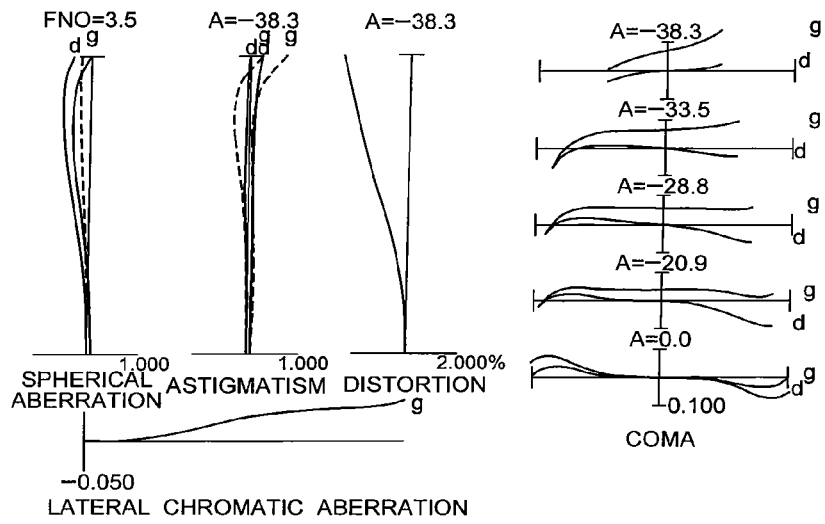
Figure 4B:
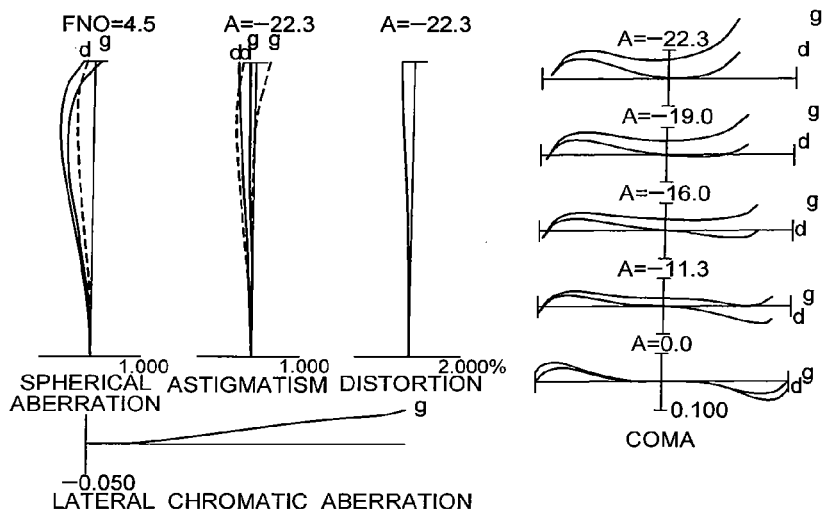
Figure 4C:
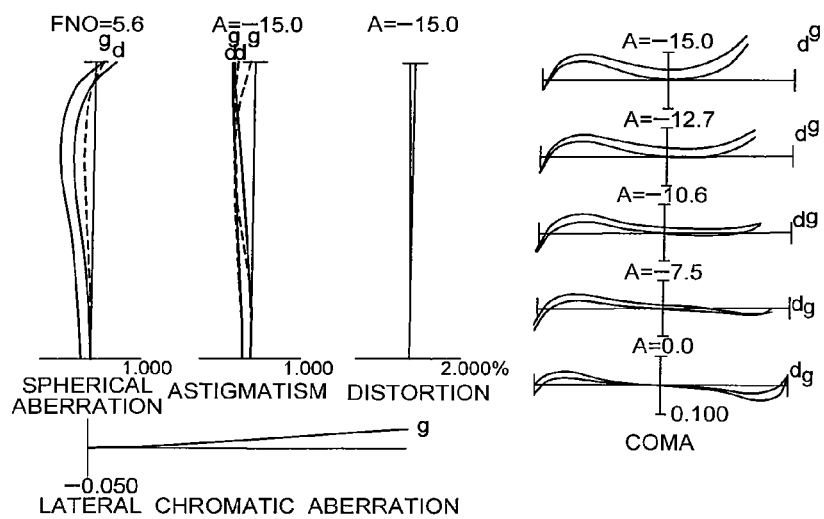

FIGS. 4A, 4B and 4C are graphs showing various aberrations of the optical system according to Example 2 upon focusing on infinity, in which FIG. 4A is in a wide-angle end state (f=18.5), FIG. 4B is in an intermediate focal length state (f=35.0), and FIG. 4C is in a telephoto end state (f=53.5).

As is apparent from the respective graphs, the optical system according to Example 2 shows superb optical performance as a result of good corrections to various aberrations in the wide-angle end state, in the intermediate focal length state, and in the telephoto end state.

EXAMPLE 3

FIG. 5 is a sectional view showing a lens configuration of an optical system according to Example 3 of the present application.

The optical system according to Example 3 is composed of, in order from an object, a first lens group G1 having negative refractive power, a second lens group G2 having positive refractive power, and a third lens group G3 having negative refractive power.

The first lens group G1 is composed of, in order from the object, a negative meniscus lens L11 having convex surface facing the object, a negative meniscus lens L12 having a convex surface facing the object, and a positive meniscus lens L13 having a convex surface facing the object. The negative meniscus lens L12 is an aspherical lens that a resin layer is applied on an image side glass surface and formed an aspherical surface thereon.

The second lens group G2 is composed of, in order from the object, a cemented lens constructed by a double convex positive lens L21 cemented with a negative meniscus lens L22 having a concave surface facing the object, a cemented lens constructed by a double convex positive lens L23 cemented with a double concave negative lens L24, and a double convex positive lens L25.

The third lens group G3 is composed of a negative meniscus lens L31 having a concave surface facing the object.

In the above-described optical system according to Example 3, varying a focal length is carried out by varying a distance between the first lens group G1 and the second lens group G2, and increasing a distance between the second lens group G2 and the third lens group G3.

In the optical system according to Example 3, an aperture stop S is disposed in the second lens group G2, and moved together with the second lens group G2 upon varying a focal length from the wide-angle end state to the telephoto end state.

In the optical system according to Example 3, focusing from an infinity object to a close object is carried out by moving the first lens group G1.

In the optical system according to Example 3, the positive meniscus lens L13 in the first lens group G1 is an A lens. Since the A lens is disposed to the object side of the aperture stop S, the A lens has a positive meniscus shape having a convex surface facing the object, so that an incident angle of an oblique ray not parallel to the optical axis onto the A lens becomes close to the normal.

Various values associated with the optical system according to Example 3 are listed in Table 3.

TABLE 3

[Lens Data]

| i | r | d | nd | vd |
|---|---|---|---|---|
| 1 | 44.7484 | 1.80 | 1.88300 | 40.8 |
| 2 | 19.0070 | 8.50 | | |
| 3 | 81.8610 | 1.60 | 1.77250 | 49.6 |

TABLE 3-continued

| | | | | |
|---|---|---|---|---|
| 4 | 52.8000 | 0.20 | 1.55389 | 38.1 |
| 5* | 43.1816 | 2.75 | | |
| 6 | 29.7977 | 3.50 | 1.94595 | 18.0 |
| 7 | 41.6291 | d7 | | |
| 8 | 27.9527 | 5.70 | 1.62041 | 60.3 |
| 9 | −57.7149 | 1.00 | 1.80100 | 35.0 |
| 10 | −526.6817 | 1.50 | | |
| 11 | ∞ | 1.00 | Aperture Stop S | |
| 12 | 20.9370 | 6.75 | 1.65160 | 58.5 |
| 13 | −36.7727 | 5.00 | 1.83400 | 37.2 |
| 14 | 14.8195 | 1.50 | | |
| 15 | 27.4570 | 4.00 | 1.58144 | 40.8 |
| 16 | −68.0982 | d16 | | |
| 17 | −83.5171 | 1.00 | 1.51680 | 64.1 |
| 18 | −237.5589 | Bf | | |

[Aspherical Data]
Surface Number: 5

| κ = | −2.4420 |
|---|---|
| A3 = | +0.0000 |
| A4 = | −4.0180E−07 |
| A6 = | +7.7512E−09 |
| A8 = | −2.3967E−10 |
| A10 = | +1.0250E−12 |
| A12 = | −1.9550E−15 |

| | W | M | T |
|---|---|---|---|

[Specifications]
Zoom Ratio: 3.16

| F | 29.0 | 50.0 | 91.7 |
|---|---|---|---|
| FNO | 4.1 | 4.5 | 5.8 |
| 2ω | 76.6 | 46.8 | 26.3 |
| Y | 21.6 | 21.6 | 21.6 |
| TL | 129.10 | 121.85 | 138.77 |
| BF | 38.91 | 51.29 | 75.04 |

[Variable Distances]

| d7 | 42.02 | 18.05 | 2.89 |
|---|---|---|---|
| d16 | 2.37 | 6.72 | 15.04 |
| d18(Bf) | 38.91 | 51.29 | 75.04 |

[Lens Group Data]

| Group | i | focal length |
|---|---|---|
| 1 | 1 | −43.42 |
| 2 | 8 | 35.05 |
| 3 | 17 | −249.77 |

[Values for Conditional Expressions: (L13)]

| (1): nA − 0.00250νA = | 1.90100 |
|---|---|
| (2): nA − 0.33750νA = | −4.12230 |
| (3): (r2 + r1)/(r2 − r1) = | 6.04 |
| (4): (r2 + r1)/(r2 − r1) = | 6.04 |
| (5): fa/fg = | −2.23 |

Figure 6A:
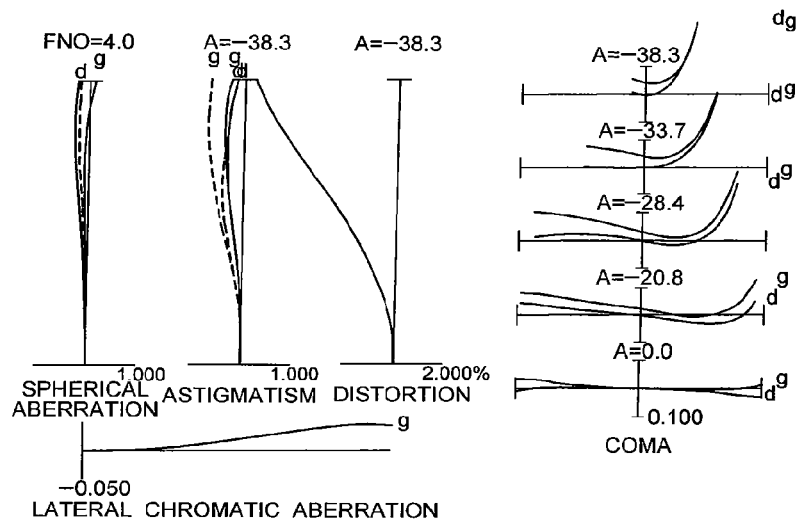
Figure 6B:
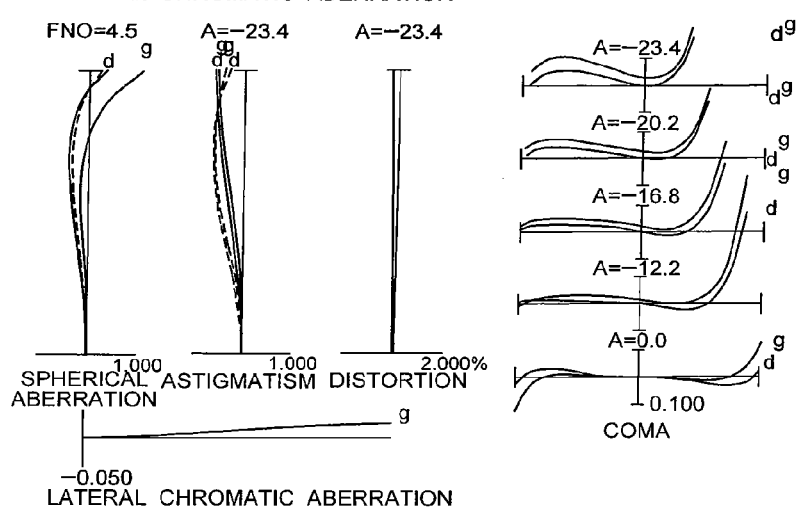
Figure 6C:
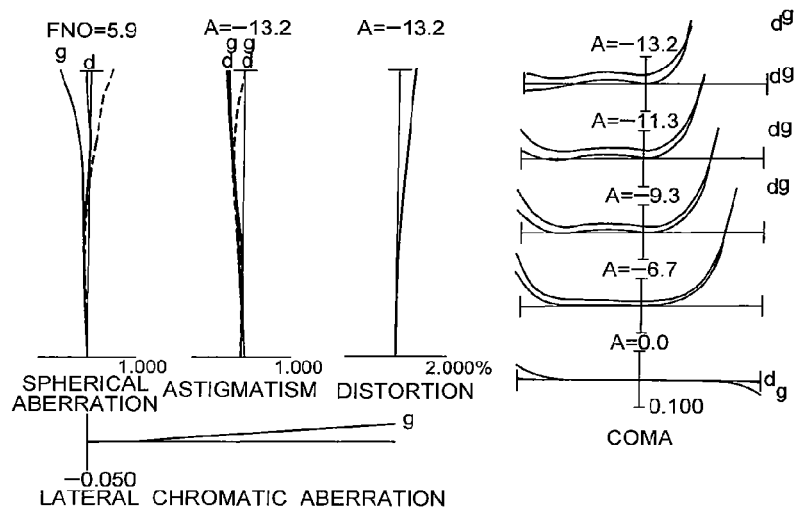

FIGS. 6A, 6B and 6C are graphs showing various aberrations of the optical system according to Example 3 upon focusing on infinity, in which FIG. 6A is in a wide-angle end state (f=29.0), FIG. 6B is in an intermediate focal length state (f=50.0), and FIG. 6C is in a telephoto end state (f=91.7).

As is apparent from the respective graphs, the optical system according to Example 3 shows superb optical performance as a result of good corrections to various aberrations in the wide-angle end state, in the intermediate focal length state, and in the telephoto end state.

EXAMPLE 4

FIG. 7 is a sectional view showing a lens configuration of an optical system according to Example 4 of the present application.

The optical system according to Example 4 is composed of, in order from an object, a first lens group G1 having negative refractive power, a second lens group G2 having positive refractive power, and a third lens group G3 having negative refractive power.

The first lens group G1 is composed of, in order from the object, a negative meniscus lens L11 having convex surface facing the object, a negative meniscus lens L12 having a convex surface facing the object, and a positive meniscus lens L13 having a convex surface facing the object. The negative meniscus lens L12 is an aspherical lens that a resin layer is applied on an image side glass surface and formed an aspherical surface thereon.

The second lens group G2 is composed of, in order from the object, a cemented lens constructed by a double convex positive lens L21 cemented with a negative meniscus lens L22 having a concave surface facing the object, a cemented lens constructed by a double convex positive lens L23 cemented with a double concave negative lens L24, and a double convex positive lens L25.

The third lens group G3 is composed of a negative meniscus lens L31 having a concave surface facing the object.

In the above-described optical system according to Example 4, varying a focal length from a wide-angle end state to a telephoto end state is carried out by varying a distance between the first lens group G1 and the second lens group G2, and increasing a distance between the second lens group G2 and the third lens group G3.

In the optical system according to Example 4, an aperture stop S is disposed in the second lens group G2, and moved together with the second lens group G2 upon varying a focal length from the wide-angle end state to the telephoto end state.

In the optical system according to Example 4, focusing from an infinity object to a close object is carried out by moving the first lens group G1.

In the optical system according to Example 4, the positive meniscus lens L13 in the first lens group G1 is an A lens. Since the A lens is disposed to the object side of the aperture stop S, the A lens has a positive meniscus shape having a convex surface facing the object, so that an incident angle of an oblique ray not parallel to the optical axis onto the A lens becomes close to the normal.

Various values associated with the optical system according to Example 4 are listed in Table 4.

TABLE 4

[Lens Data]

| i | r | d | nd | vd |
|---|---|---|---|---|
| 1 | 44.2009 | 1.80 | 1.90265 | 35.7 |
| 2 | 19.0358 | 8.50 | | |
| 3 | 88.6772 | 1.60 | 1.77250 | 49.6 |
| 4 | 52.8000 | 0.20 | 1.55389 | 38.1 |
| 5* | 43.1816 | 2.75 | | |
| 6 | 30.8314 | 3.50 | 2.14352 | 17.8 |
| 7 | 41.6237 | d7 | | |
| 8 | 27.2269 | 5.70 | 1.62041 | 60.3 |
| 9 | −59.8727 | 1.00 | 1.80100 | 35.0 |
| 10 | −561.2797 | 1.50 | | |
| 11 | ∞ | 1.00 | Aperture Stop S | |
| 12 | 21.3881 | 6.75 | 1.65160 | 58.5 |
| 13 | −34.0769 | 5.00 | 1.83400 | 37.2 |
| 14 | 14.8949 | 1.50 | | |
| 15 | 27.4070 | 4.00 | 1.58144 | 40.8 |
| 16 | −67.0190 | d16 | | |
| 17 | −78.9307 | 1.00 | 1.51680 | 64.1 |
| 18 | −204.0294 | BF | | |

TABLE 4-continued

[Aspherical Data]
Surface Number: 5

| κ = | −2.2368 |
|---|---|
| A3 = | +0.0000 |
| A4 = | −6.1562E−07 |
| A6 = | +5.4178E−09 |
| A8 = | −2.1299E−10 |
| A10 = | +9.1017E−13 |
| A12 = | −1.7805E−15 |

| | W | M | T |
|---|---|---|---|

[Specifications]
Zoom Ratio: 3.16

| f | 29.0 | 50.0 | 91.7 |
|---|---|---|---|
| FNO | 4.1 | 4.5 | 5.8 |
| 2ω | 76.6 | 46.8 | 26.3 |
| Y | 21.6 | 21.6 | 21.6 |
| TL | 129.23 | 121.98 | 138.90 |
| BF | 38.85 | 51.23 | 74.98 |

[Variable Distances]

| d7 | 42.24 | 18.27 | 3.11 |
|---|---|---|---|
| d16 | 2.34 | 6.68 | 15.01 |
| d18(Bf) | 38.85 | 51.23 | 74.98 |

[Lens Group Data]

| Group | i | focal length |
|---|---|---|
| 1 | 1 | −43.42 |
| 2 | 8 | 35.05 |
| 3 | 17 | −249.77 |

[Values for Conditional Expressions: (L13)]

| (1): nA − 0.00250vA = | 2.09910 |
|---|---|
| (2): nA − 0.33750vA = | −3.85385 |
| (3): (r2 + r1)/(r2 − r1) = | 6.71 |
| (4): (r2 + r1)/(r2 − r1) = | 6.71 |
| (5): fA/fG = | −2.04 |

Figure 8A:
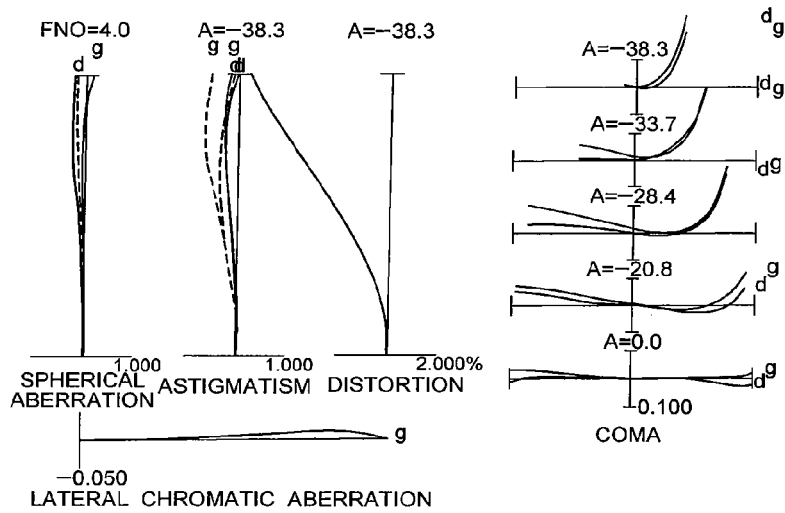
Figure 8B:
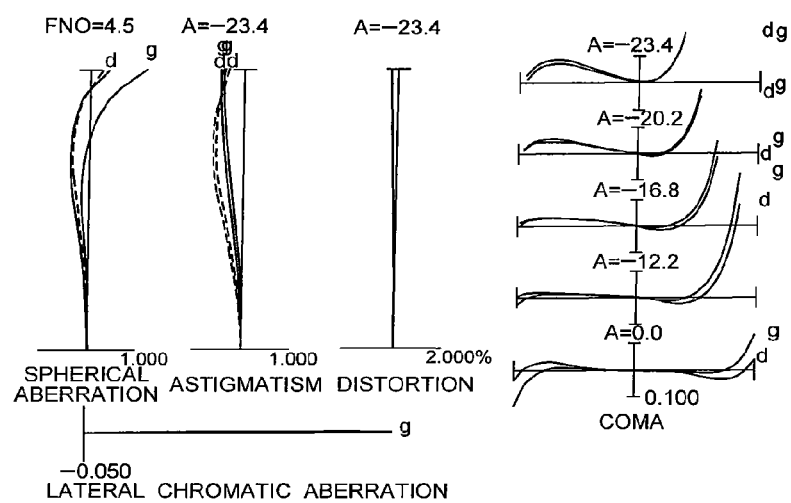
Figure 8C:
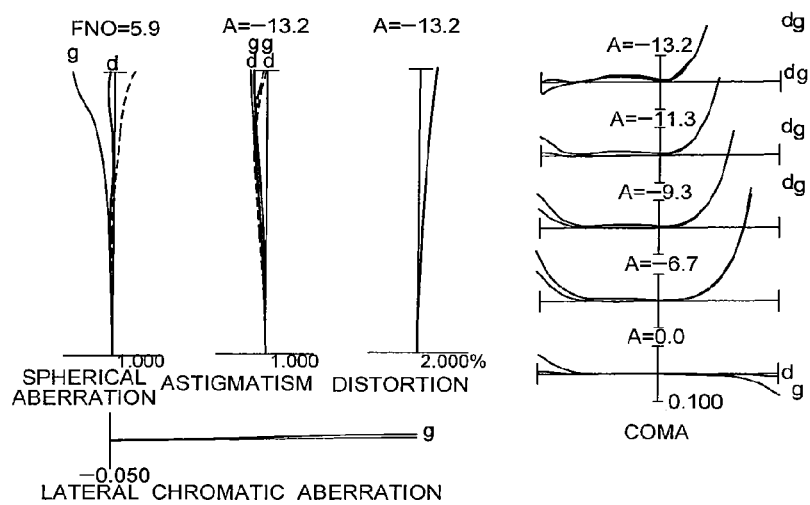

FIGS. 8A, 8B and 8C are graphs showing various aberrations of the optical system according to Example 4 upon focusing on infinity, in which FIG. 8A is in a wide-angle end state (f=29.0), FIG. 8B is in an intermediate focal length state (f=50.0), and FIG. 8C is in a telephoto end state (f=91.7).

As is apparent from the respective graphs, the optical system according to Example 4 shows superb optical performance as a result of good corrections to various aberrations in the wide-angle end state, in the intermediate focal length state, and in the telephoto end state.

EXAMPLE 5

Figure 9:
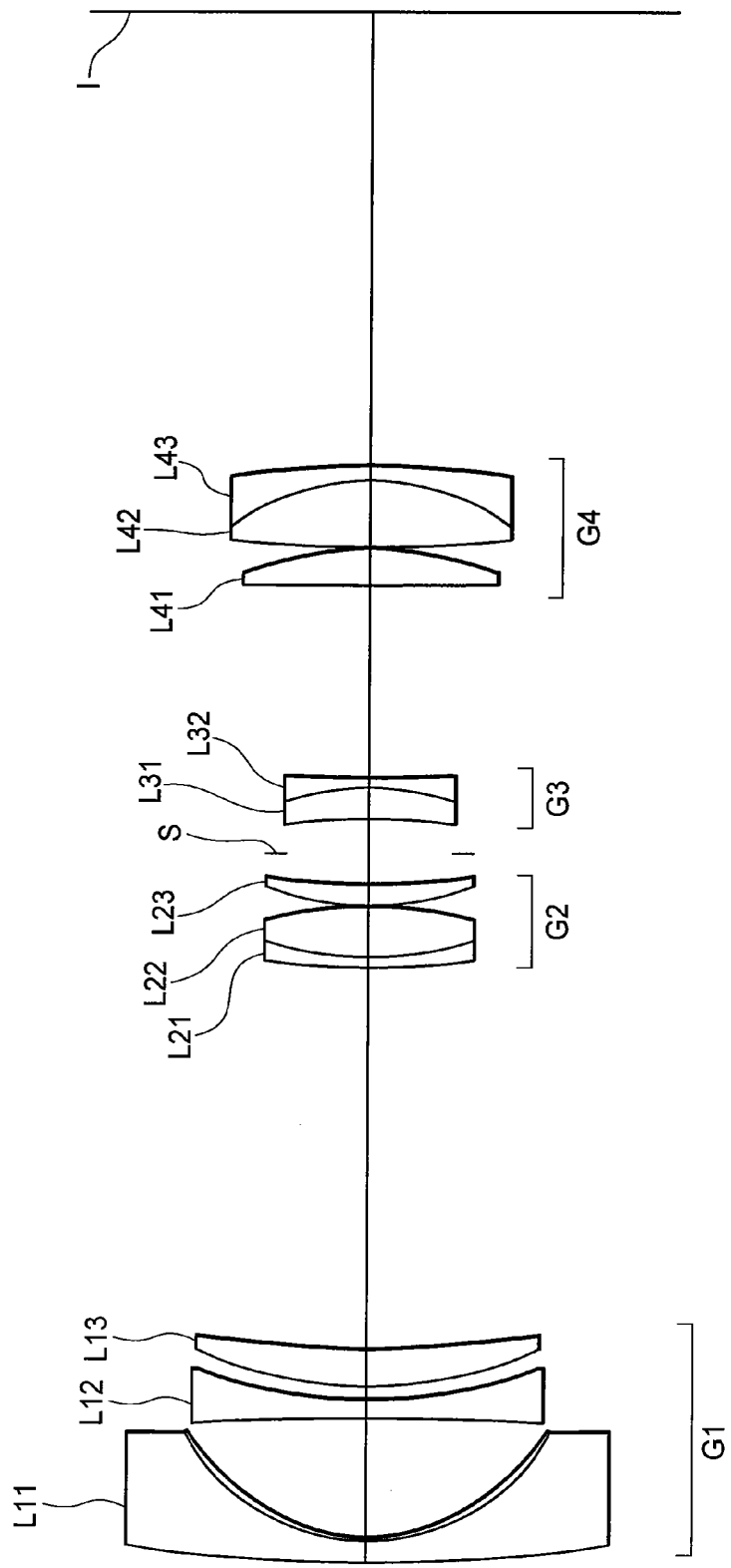
FIG. 9 is a sectional view showing a lens configuration of an optical system according to Example 5 of the present application.

FIG. 9 is a sectional view showing a lens configuration of an optical system according to Example 5 of the present application.

The optical system according to Example 5 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object. The negative meniscus lens L11 is an aspherical lens that a resin layer is applied on an image side glass surface and formed an aspherical surface thereon.

The second lens group G2 is composed of, in order from the object, a cemented lens constructed by a negative meniscus lens L21 having a convex surface facing the object cemented with a double convex positive lens L22, and a positive meniscus lens L23 having a convex surface facing the object.

The third lens group G3 is composed of a cemented lens constructed by, in order from the object, a positive meniscus lens L31 having a concave surface facing the object cemented with a double concave negative lens L32.

The fourth lens group G4 is composed of, in order from the object, a plano-convex positive lens L41 having a plane surface facing the object, and a cemented lens constructed by a double convex positive lens L42 cemented with a negative meniscus lens L43 having a concave surface facing the object.

In the above-described optical system according to Example 5, varying a focal length from a wide-angle end state to a telephoto end state is carried out by varying a distance between the first lens group G1 and the second lens group G2, increasing a distance between the second lens group G2 and the third lens group G3, and decreasing a distance between the third lens group G3 and the fourth lens group G4.

In the optical system according to Example 5, an aperture stop S is disposed to the object side of the third lens group G3, and moved together with the third lens group G3 upon varying a focal length from the wide-angle end state to the telephoto end state.

In the optical system according to Example 5, focusing from an infinity object to a close object is carried out by moving the first lens group G1.

In the optical system according to Example 5, the positive meniscus lens L31 in the third lens group G3 is an A lens. Since the A lens is disposed to the image side of the aperture stop S, the A lens has a meniscus shape having a concave surface facing the object, so that an incident angle of an oblique ray not parallel to the optical axis onto the A lens becomes close to the normal.

Various values associated with the optical system according to Example 5 are listed in Table 5.

TABLE 5

[Lens Data]

| i | r | d | nd | vd |
|---|---|---|---|---|
| 1 | 115.5513 | 1.90 | 1.51680 | 64.1 |
| 2 | 15.6014 | 0.17 | 1.55389 | 38.1 |
| 3* | 13.3000 | 10.00 | | |
| 4 | −203.6563 | 1.50 | 1.62299 | 58.2 |
| 5 | 35.4686 | 1.10 | | |
| 6 | 29.5562 | 3.10 | 1.78472 | 25.7 |
| 7 | 74.7181 | d7 | | |
| 8 | 59.7272 | 0.90 | 1.84666 | 23.8 |
| 9 | 23.3566 | 4.30 | 1.51823 | 58.9 |
| 10 | −28.6402 | 0.10 | | |
| 11 | 19.3966 | 1.80 | 1.51823 | 58.9 |
| 12 | 52.8204 | d12 | | |
| 13 | ∞ | 2.90 | Aperture Stop S | |
| 14 | −43.5025 | 2.75 | 1.94595 | 18.0 |
| 15 | −17.9969 | 0.80 | 1.85000 | 32.4 |
| 16 | 111.8314 | d16 | | |
| 17 | ∞ | 3.20 | 1.51742 | 52.3 |
| 18 | −23.6843 | 0.10 | | |
| 19 | 100.1845 | 5.70 | 1.49700 | 81.6 |
| 20 | −16.5860 | 1.30 | 1.85026 | 32.4 |
| 21 | −55.6622 | Bf | | |

[Aspherical Data]
Surface Number: 3

| κ = | 0.0000 |
|---|---|

TABLE 5-continued

| A3 = | +0.0000 |
|---|---|
| A4 = | +2.6205E−05 |
| A6 = | +5.9408E−08 |
| A8 = | −4.8810E−11 |
| A10 = | +7.6103E−13 |
| A12 = | +0.0000 |

| | W | M | T |
|---|---|---|---|
| [Specifications] | | | |
| Zoom Ratio: 2.89 | | | |
| f | 18.5 | 35.3 | 53.4 |
| FNO | 3.8 | 5.3 | 6.2 |
| 2ω | 78.5 | 44.2 | 29.8 |
| Y | 14.25 | 14.25 | 14.25 |
| TL | 131.31 | 125.64 | 136.79 |
| Bf | 38.14 | 55.12 | 73.74 |
| [Variable Distances] | | | |
| d7 | 32.30 | 9.65 | 2.18 |
| d12 | 2.71 | 8.06 | 12.30 |
| d16 | 16.54 | 11.19 | 6.96 |
| d21(Bf) | 38.14 | 55.12 | 73.74 |

[Lens Group Data]

| Group | i | focal length |
|---|---|---|
| 1 | 1 | −24.96 |
| 2 | 8 | 28.22 |
| 3 | 14 | −41.43 |
| 4 | 17 | 46.91 |

[Values for Conditional Expressions: (L31)]

| (1): nA − 0.00250vA = | 2.00900 |
|---|---|
| (2): nA − 0.33750vA = | −4.12230 |
| (3): (r2 + r1)/(r2 − r1) = | −2.41 |
| (4): (r2 + r1)/(r2 − r1) = | −2.41 |
| (5): fA/fG = | −0.74 |

Figure 10A:
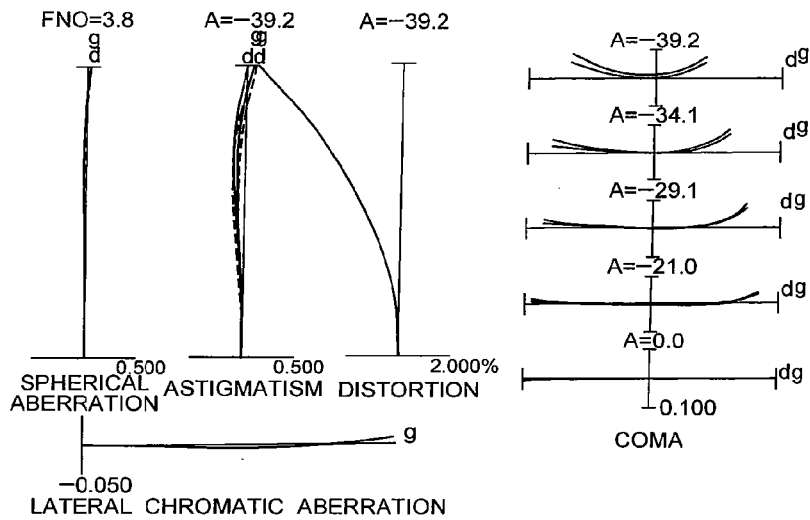
Figure 10B:
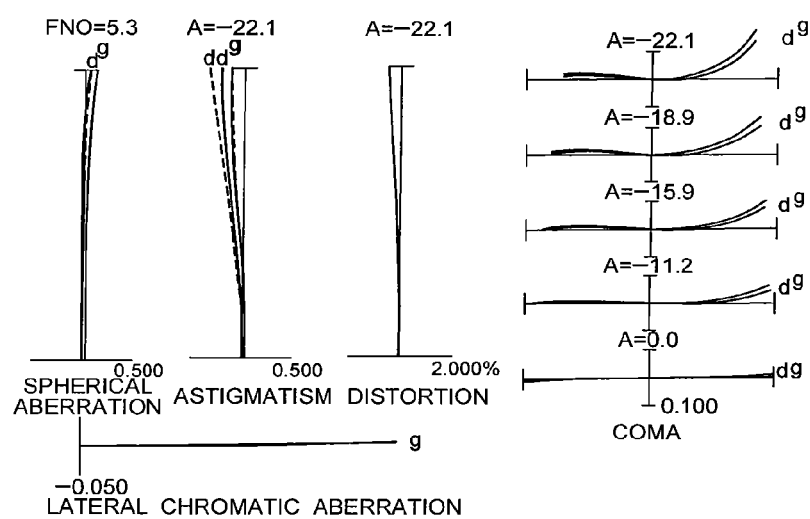
Figure 10C:
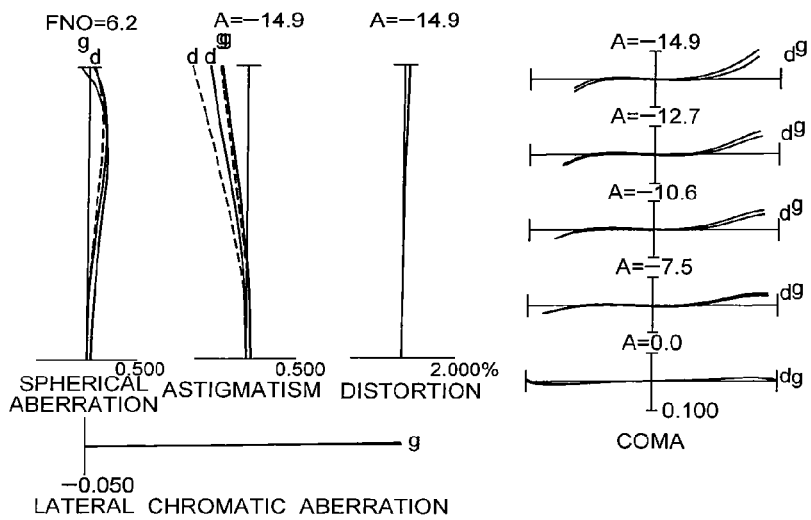

FIGS. 10A, 10B and 10C are graphs showing various aberrations of the optical system according to Example 5 upon focusing on infinity, in which FIG. 10A is in a wide-angle end state (f=18.5), FIG. 10B is in an intermediate focal length state (f=35.3), and FIG. 10C is in a telephoto end state (f=53.4).

As is apparent from the respective graphs, the optical system according to Example 5 shows superb optical performance as a result of good corrections to various aberrations in the wide-angle end state, in the intermediate focal length state, and in the telephoto end state.

EXAMPLE 6

Figure 11:
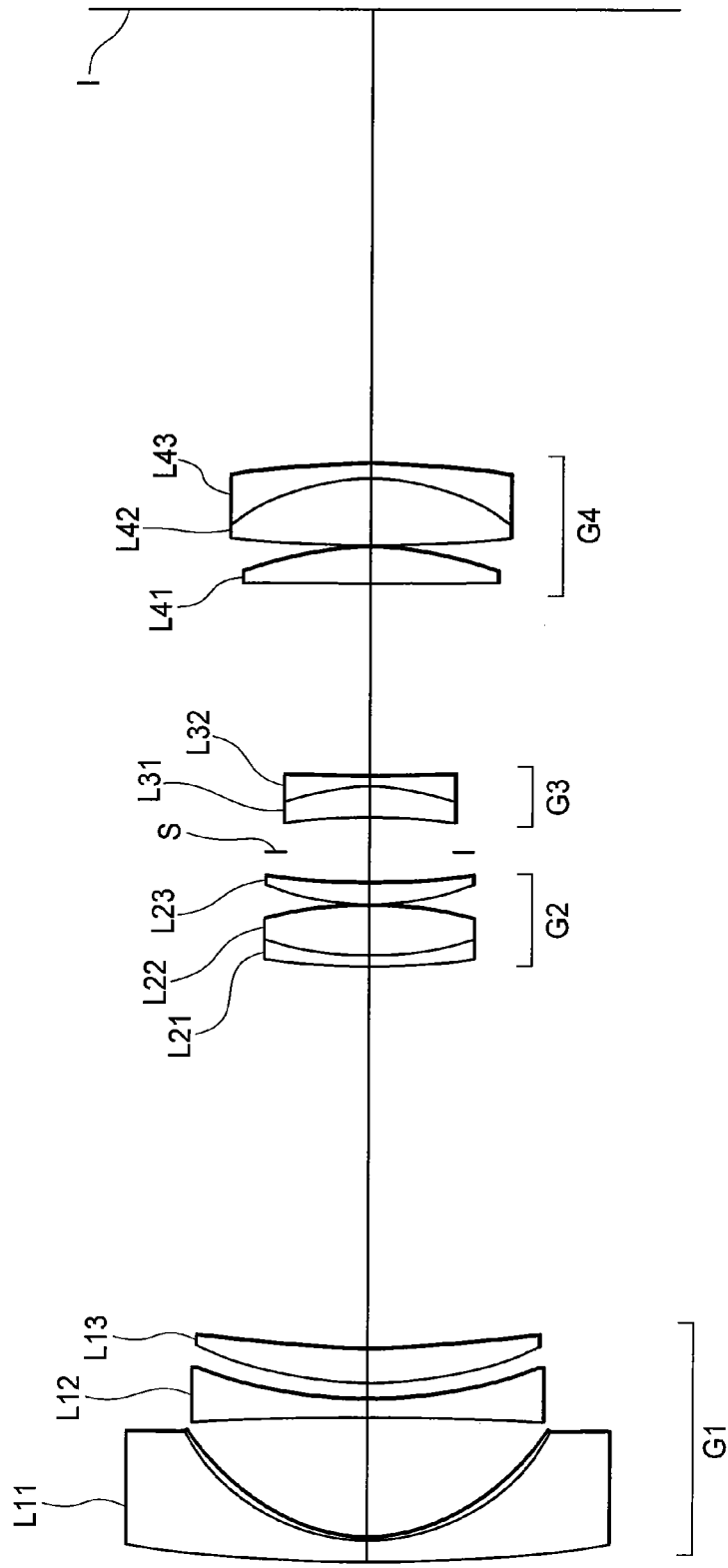
FIG. 11 is a sectional view showing a lens configuration of an optical system according to Example 6 of the present application.

FIG. 11 is a sectional view showing a lens configuration of an optical system according to Example 6 of the present application.

The optical system according to Example 6 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object. The negative meniscus lens L11 is an aspherical lens that a resin layer is applied on an image side glass surface and formed an aspherical surface thereon.

The second lens group G2 is composed of, in order from the object, a cemented lens constructed by a negative meniscus lens L21 having a convex surface facing the object cemented with a double convex positive lens L22, and a positive meniscus lens L23 having a convex surface facing the object.

The third lens group G3 is composed of a cemented lens constructed by, in order from the object, a positive meniscus lens L31 having a concave surface facing the object cemented with a double concave negative lens L32.

The fourth lens group G4 is composed of, in order from the object, a plano-convex positive lens L41 having a plane surface facing the object, and a cemented lens constructed by a double convex positive lens L42 cemented with a negative meniscus lens L43 having a concave surface facing the object.

In the above-described optical system according to Example 6, varying a focal length from a wide-angle end state to a telephoto end state is carried out by varying a distance between the first lens group G1 and the second lens group G2, increasing a distance between the second lens group G2 and the third lens group G3, and decreasing a distance between the third lens group G3 and the fourth lens group G4.

In the optical system according to Example 6, an aperture stop S is disposed to the object side of the third lens group G3, and moved together with the third lens group G3 upon varying a focal length from the wide-angle end state to the telephoto end state.

In the optical system according to Example 6, focusing from an infinity object to a close object is carried out by moving the first lens group G1.

In the optical system according to Example 6, the positive meniscus lens L31 in the third lens group G3 is an A lens. Since the A lens is disposed to the image side of the aperture stop S, the A lens has a meniscus shape having a concave surface facing the object, so that an incident angle of an oblique ray not parallel to the optical axis onto the A lens becomes close to the normal.

Various values associated with the optical system according to Example 6 are listed in Table 6.

TABLE 6

[Lens Data]

| i | r | d | nd | vd |
|---|---|---|---|---|
| 1 | 115.5513 | 1.90 | 1.51680 | 64.1 |
| 2 | 15.6014 | 0.17 | 1.55389 | 38.1 |
| 3* | 13.3000 | 10.00 | | |
| 4 | −180.3836 | 1.50 | 1.62299 | 58.2 |
| 5 | 36.7979 | 1.10 | | |
| 6 | 29.8103 | 3.10 | 1.78472 | 25.7 |
| 7 | 74.7181 | d7 | | |
| 8 | 50.5666 | 0.90 | 1.84666 | 23.8 |
| 9 | 21.7186 | 4.30 | 1.51823 | 58.9 |
| 10 | −29.0198 | 0.10 | | |
| 11 | 19.2917 | 1.80 | 1.51823 | 58.9 |
| 12 | 46.5501 | d12 | | |
| 13 | ∞ | 2.90 | Aperture Stop S | |
| 14 | −40.1312 | 2.75 | 2.00170 | 20.7 |
| 15 | −15.5486 | 0.80 | 1.89800 | 34.0 |
| 16 | 152.9489 | d16 | | |
| 17 | ∞ | 3.20 | 1.51742 | 52.3 |
| 18 | −23.8646 | 0.10 | | |
| 19 | 101.1522 | 5.70 | 1.49700 | 81.6 |
| 20 | −16.5227 | 1.30 | 1.85026 | 32.4 |
| 21 | −54.1237 | Bf | | |

[Aspherical Data]
Surface Number: 3

| κ = | 0.0000 |
|---|---|

TABLE 6-continued

| A3 = | +0.0000 |
|---|---|
| A4 = | +2.6205E−05 |
| A6 = | +5.9408E−08 |
| A8 = | −4.8810E−11 |
| A10 = | +7.6103E−13 |
| A12 = | +0.0000 |

| | W | M | T |
|---|---|---|---|
| [Specifications] | | | |
| Zoom Ratio: 2.89 | | | |
| f | 18.5 | 35.3 | 53.4 |
| FNO | 3.6 | 5.2 | 6.0 |
| 2ω | 78.4 | 44.2 | 29.8 |
| Y | 14.25 | 14.25 | 14.25 |
| TL | 131.31 | 125.69 | 136.93 |
| Bf | 38.14 | 55.17 | 73.88 |
| [Variable Distances] | | | |
| d7 | 32.30 | 9.65 | 2.18 |
| d12 | 2.71 | 8.06 | 12.30 |
| d16 | 16.54 | 11.19 | 6.96 |
| d21(Bf) | 38.14 | 55.17 | 73.88 |

[Lens Group Data]

| Group | i | focal length |
|---|---|---|
| 1 | 1 | −24.97 |
| 2 | 8 | 28.20 |
| 3 | 14 | −41.36 |
| 4 | 17 | 46.69 |

[Values for Conditional Expressions: (L31)]

| (1): nA − 0.00250vA = | 1.95020 |
|---|---|
| (2): nA − 0.33750vA = | −4.95080 |
| (3): (r2 + r1)/(r2 − r1) = | −2.27 |
| (4): (r2 + r1)/(r2 − r1) = | −2.27 |
| (5): fA/fG = | −0.58 |

Figure 12A:
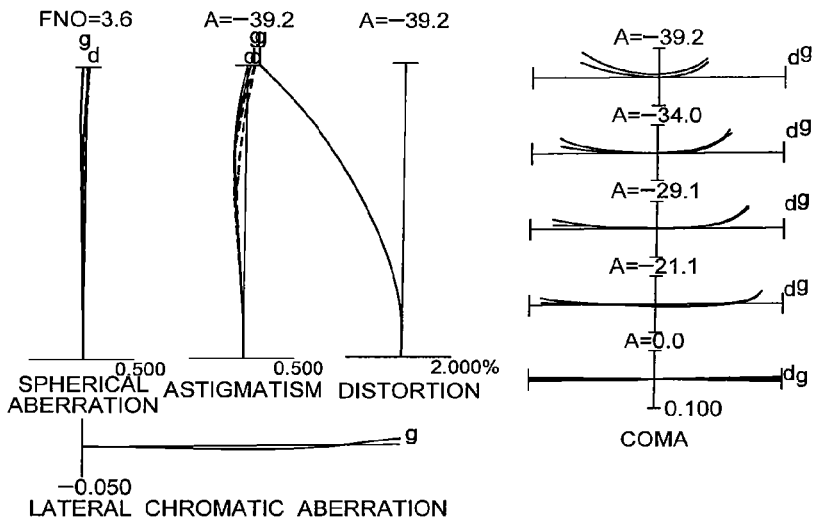
Figure 12B:
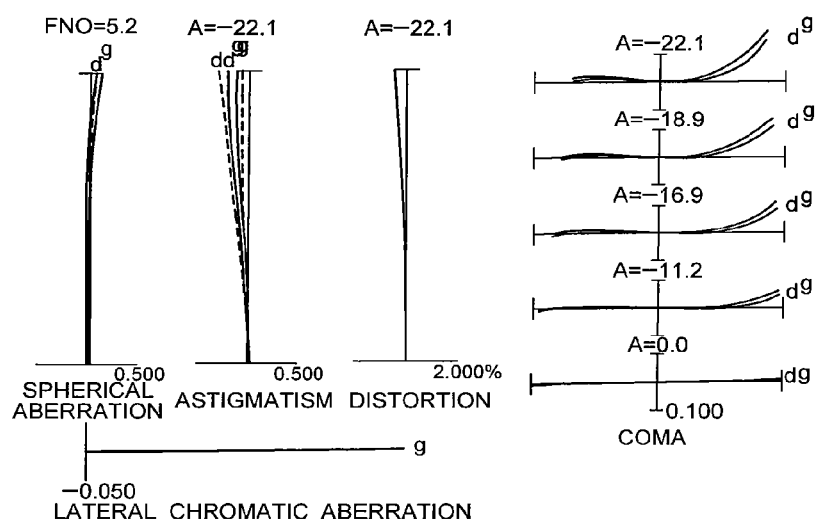
Figure 12C:
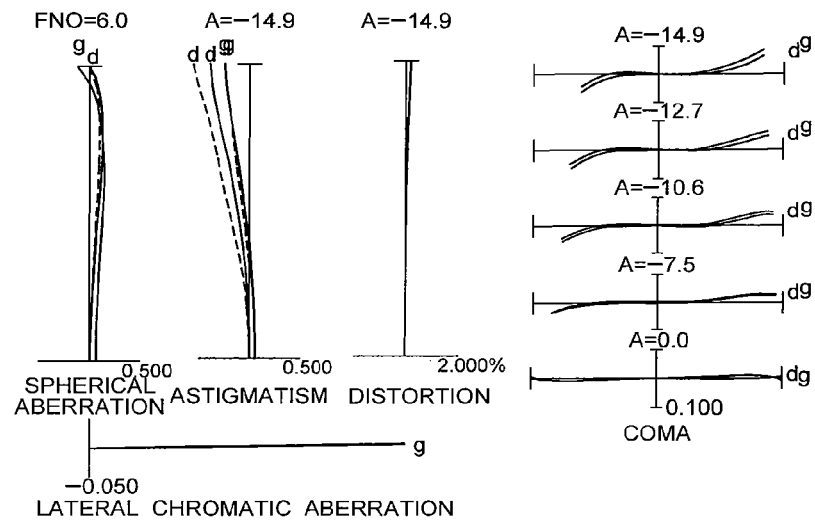

FIGS. 12A, 12B and 12C are graphs showing various aberrations of the optical system according to Example 6 upon focusing on infinity, in which FIG. 12A is in a wide-angle end state (f=18.5), FIG. 12B is in an intermediate focal length state (f=35.3), and FIG. 12C is in a telephoto end state (f=53.4).

As is apparent from the respective graphs, the optical system according to Example 6 shows superb optical performance as a result of good corrections to various aberrations in the wide-angle end state, in the intermediate focal length state, and in the telephoto end state.

EXAMPLE 7

FIG. 13 is a sectional view showing a lens configuration of an optical system according to Example 7 of the present application.

The optical system according to Example 7 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object. The negative meniscus lens L11 is an aspherical lens that a resin layer is applied on an image side glass surface and formed an aspherical surface thereon.

The second lens group G2 is composed of, in order from the object, a cemented lens constructed by a negative meniscus lens L21 having a convex surface facing the object cemented with a double convex positive lens L22, and a positive meniscus lens L23 having a convex surface facing the object.

The third lens group G3 is composed of a cemented lens constructed by, in order from the object, a positive meniscus lens L31 having a concave surface facing the object cemented with a double concave negative lens L32.

The fourth lens group G4 is composed of, in order from the object, a plano-convex positive lens L41 having a plane surface facing the object, and a cemented lens constructed by a double convex positive lens L42 cemented with a negative meniscus lens L43 having a concave surface facing the object.

In the above-described optical system according to Example 7, varying a focal length from a wide-angle end state to a telephoto end state is carried out by varying a distance between the first lens group G1 and the second lens group G2, increasing a distance between the second lens group G2 and the third lens group G3, and decreasing a distance between the third lens group G3 and the fourth lens group G4.

In the optical system according to Example 7, an aperture stop S is disposed to the object side of the third lens group G3, and moved together with the third lens group G3 upon varying a focal length from the wide-angle end state to the telephoto end state.

In the optical system according to Example 7, focusing from an infinity object to a close object is carried out by moving the first lens group G1.

In the optical system according to Example 7, the positive meniscus lens L31 in the third lens group G3 is an A lens. Since the A lens is disposed to the image side of the aperture stop S, the A lens has a meniscus shape having a concave surface facing the object, so that an incident angle of an oblique ray not parallel to the optical axis onto the A lens becomes close to the normal.

Various values associated with the optical system according to Example 7 are listed in Table 7.

TABLE 7

[Lens Data]

| i | r | d | nd | νd |
|---|---|---|---|---|
| 1 | 115.5513 | 1.90 | 1.51680 | 64.1 |
| 2 | 15.6014 | 0.17 | 1.55389 | 38.1 |
| 3* | 13.3000 | 10.00 | | |
| 4 | −248.6179 | 1.50 | 1.62299 | 58.2 |
| 5 | 34.6127 | 1.10 | | |
| 6 | 29.6569 | 3.10 | 1.78472 | 25.7 |
| 7 | 74.7181 | d7 | | |
| 8 | 53.9942 | 0.90 | 1.84666 | 23.8 |
| 9 | 22.5667 | 4.30 | 1.51823 | 58.9 |
| 10 | −29.5940 | 0.10 | | |
| 11 | 19.0339 | 1.80 | 1.51823 | 58.9 |
| 12 | 47.2870 | d12 | | |
| 13 | ∞ | 2.90 | Aperture Stop S | |
| 14 | −43.2107 | 2.75 | 2.14352 | 17.8 |
| 15 | −17.4145 | 0.80 | 2.00330 | 28.3 |
| 16 | 198.6809 | d16 | | |
| 17 | ∞ | 3.20 | 1.51742 | 52.3 |
| 18 | −24.5210 | 0.10 | | |
| 19 | 90.7179 | 5.70 | 1.49700 | 81.6 |
| 20 | −16.6300 | 1.30 | 1.85026 | 32.4 |
| 21 | −55.9527 | Bf | | |

[Aspherical Data]
Surface Number: 3

| κ = | 0.0000 |
|---|---|
| A3 = | +0.0000 |
| A4 = | +2.5968E−05 |
| A6 = | +5.3443E−08 |
| A8 = | −7.4059E−11 |
| A10 = | +7.6103E−13 |
| A12 = | +0.0000 |

| | W | M | T |
|---|---|---|---|
| [Specifications] Zoom Ratio: 2.89 | | | |
| f | 18.5 | 35.3 | 53.4 |
| FNO | 3.7 | 5.3 | 6.1 |
| 2ω | 78.1 | 44.2 | 29.9 |
| Y | 14.25 | 14.25 | 14.25 |
| TL | 131.31 | 125.87 | 137.23 |
| Bf | 38.14 | 55.35 | 74.18 |
| [Variable Distances] | | | |
| d7 | 32.30 | 9.65 | 2.18 |
| d12 | 2.71 | 8.06 | 12.30 |
| d16 | 16.54 | 11.19 | 6.96 |
| d21(Bf) | 38.14 | 55.35 | 74.18 |

[Lens Group Data]

| Group | i | focal length |
|---|---|---|
| 1 | 1 | −24.97 |
| 2 | 8 | 28.41 |
| 3 | 14 | −42.74 |
| 4 | 17 | 47.47 |

[Values for Conditional Expressions: (L31)]

| (1): nA − 0.00250νA = | 2.09910 |
|---|---|
| (2): nA − 0.33750νA = | −3.85385 |
| (3): (r2 + r1)/(r2 − r1) = | −2.35 |
| (4): (r2 + r1)/(r2 − r1) = | −2.35 |
| (5): fA/fG = | −0.56 |

Figure 14A:
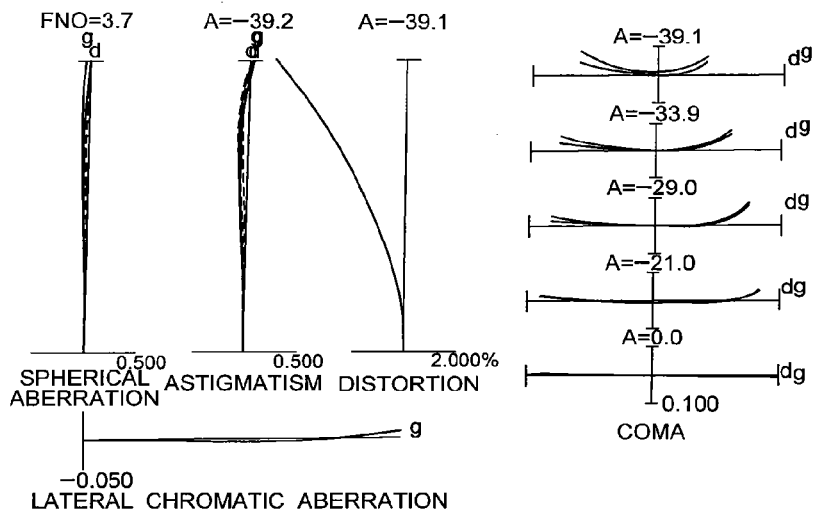
Figure 14B:
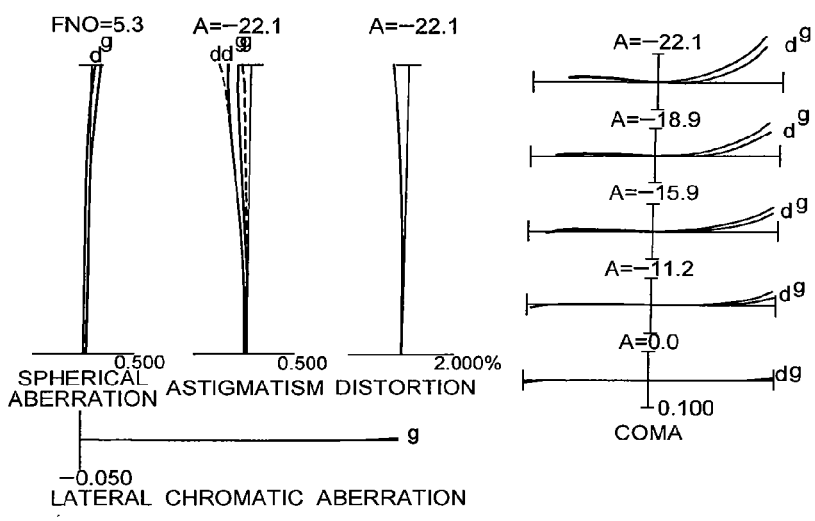
Figure 14C:
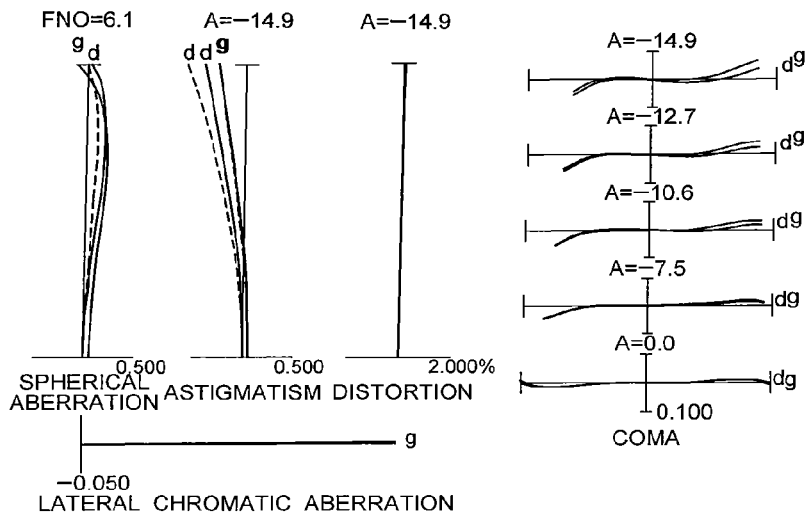

FIGS. 14A, 14B and 14C are graphs showing various aberrations of the optical system according to Example 7 upon focusing on infinity, in which FIG. 14A is in a wide-angle end state (f=18.5), FIG. 14B is in an intermediate focal length state (f=35.3), and FIG. 14C is in a telephoto end state (f=53.4).

As is apparent from the respective graphs, the optical system according to Example 7 shows superb optical performance as a result of good corrections to various aberrations in the wide-angle end state, in the intermediate focal length state, and in the telephoto end state.

EXAMPLE 8

FIG. 15 is a sectional view showing a lens configuration of an optical system according to Example 8 of the present application.

The optical system according to Example 8 is composed of, in order from an object, a first lens group G1 having negative refractive power, a second lens group G2 having positive refractive power, third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object. The negative meniscus lens L11 is an aspherical lens that a resin layer is applied on an image side glass surface and formed an aspherical surface thereon.

The second lens group G2 is composed of, in order from the object, a cemented lens constructed by a negative meniscus lens L21 having a convex surface facing the object cemented with a double convex positive lens L22, and a positive meniscus lens L23 having a convex surface facing the object.

The third lens group G3 is composed of a cemented lens constructed by, in order from the object, a positive meniscus lens L31 having a concave surface facing the object cemented with a double concave negative lens L32.

The fourth lens group G4 is composed of, in order from the object, a plano-convex positive lens L41 having a plane surface facing the object, and a cemented lens constructed by a double convex positive lens L42 cemented with a negative meniscus lens L43 having a concave surface facing the object.

In the above-described optical system according to Example 8, varying a focal length from a wide-angle end state to a telephoto end state is carried out by varying a distance between the first lens group G1 and the second lens group G2, increasing a distance between the second lens group G2 and the third lens group G3, and decreasing a distance between the third lens group G3 and the fourth lens group G4.

In the optical system according to Example 8, an aperture stop S is disposed to the object side of the third lens group G3, and moved together with the third lens group G3 upon varying a focal length from the wide-angle end state to the telephoto end state.

In the optical system according to Example 8, focusing from an infinity object to a close object is carried out by moving the first lens group G1.

In the optical system according to Example 8, the positive meniscus lens L13 in the first lens group G1 is an A lens. Since the A lens is disposed to the object side of the aperture stop S, the A lens has a meniscus shape having a convex surface facing the object, so that an incident angle of an oblique ray not parallel to the optical axis onto the A lens becomes close to the normal.

Various values associated with the optical system according to Example 8 are listed in Table 8.

TABLE 8

[Lens Data]

| i | r | d | nd | vd |
|---|---|---|---|---|
| 1 | 123.1562 | 1.90 | 1.51680 | 64.1 |
| 2 | 15.5000 | 0.17 | 1.55389 | 38.1 |
| 3* | 13.3000 | 10.00 | | |
| 4 | −183.9004 | 1.50 | 1.62299 | 58.2 |
| 5 | 53.4327 | 1.10 | | |
| 6 | 29.8607 | 3.10 | 2.00170 | 20.7 |
| 7 | 44.5512 | d7 | | |
| 8 | 34.0508 | 0.90 | 1.84666 | 23.8 |
| 9 | 18.0131 | 4.20 | 1.51823 | 58.9 |
| 10 | −30.6255 | 0.10 | | |
| 11 | 19.8978 | 1.90 | 1.51823 | 58.9 |
| 12 | 40.4509 | d12 | | |
| 13 | ∞ | 2.90 | Aperture Stop S | |
| 14 | −36.2369 | 2.75 | 1.85026 | 32.4 |
| 15 | −10.7239 | 0.80 | 1.80400 | 46.6 |
| 16 | 96.3187 | d16 | | |
| 17 | ∞ | 3.20 | 1.51823 | 58.9 |
| 18 | −24.2955 | 0.10 | | |
| 19 | 138.8999 | 5.20 | 1.48749 | 70.5 |
| 20 | −16.5664 | 1.30 | 1.85026 | 32.4 |
| 21 | −42.2488 | Bf | | |

[Aspherical Data]
Surface Number: 3

| κ = | 0.0000 |
|---|---|

TABLE 8-continued

| A3 = | +0.0000 |
|---|---|
| A4 = | +2.4776E−05 |
| A6 = | +7.6999E−08 |
| A8 = | −1.4364E−10 |
| A10 = | +9.0560E−13 |
| A12 = | +0.0000 |

| | W | M | T |
|---|---|---|---|
| [Specifications] Zoom Ratio: 2.89 | | | |
| f | 18.5 | 35.2 | 53.4 |
| FNO | 3.7 | 5.0 | 5.9 |
| 2ω | 78.0 | 44.2 | 29.7 |
| Y | 14.25 | 14.25 | 14.25 |
| TL | 131.37 | 124.82 | 135.43 |
| Bf | 38.35 | 54.44 | 72.52 |
| [Variable Distances] | | | |
| d7 | 32.95 | 10.30 | 2.83 |
| d12 | 2.50 | 7.85 | 12.08 |
| d16 | 16.46 | 11.10 | 6.87 |
| d21(Bf) | 38.35 | 54.44 | 72.52 |

[Lens Group Data]

| Group | i | focal length |
|---|---|---|
| 1 | 1 | −25.15 |
| 2 | 8 | 27.16 |
| 3 | 14 | −36.09 |
| 4 | 17 | 43.20 |

[Values for Conditional Expressions: (L13)]

| (1): nA − 0.00250vA = | 1.95020 |
|---|---|
| (2): nA − 0.33750vA = | −4.95080 |
| (3): (r2 + r1)/(r2 − r1) = | 5.07 |
| (4): (r2 + r1)/(r2 − r1) = | 5.07 |
| (5): fA/fG = | −3.25 |

Figure 16A:
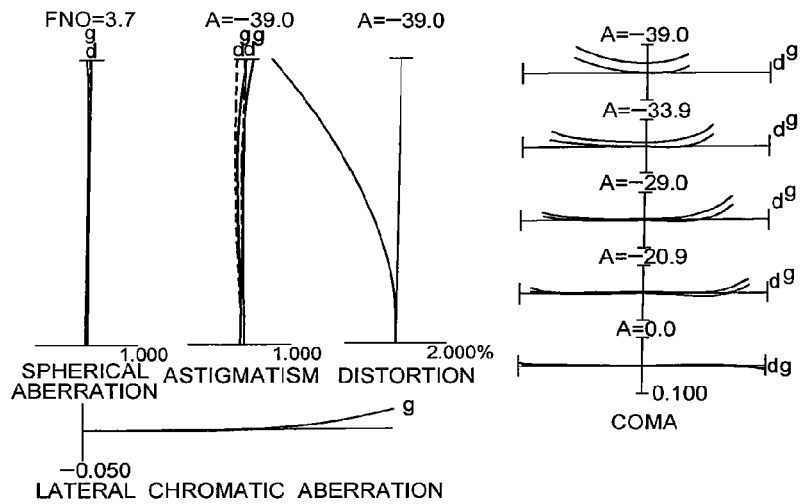
Figure 16B:
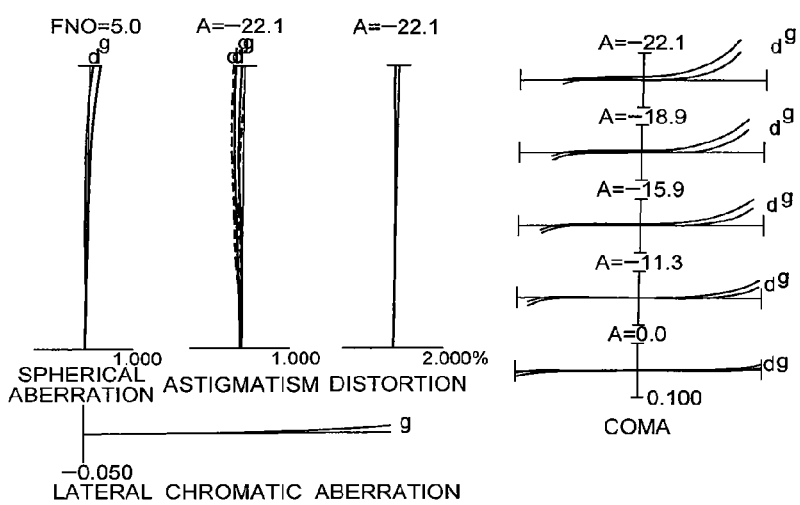
Figure 16C:
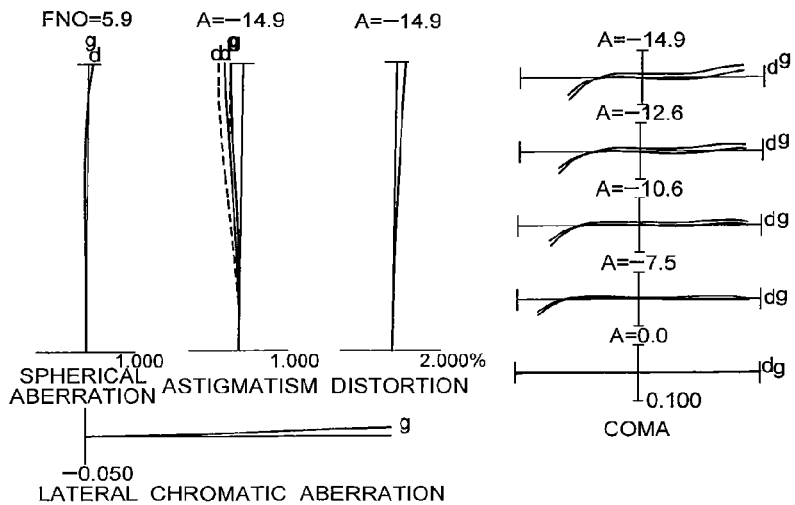

FIGS. 16A, 16B and 16C are graphs showing various aberrations of the optical system according to Example 8 upon focusing on infinity, in which FIG. 16A is in a wide-angle end state (f=18.5), FIG. 16B is in an intermediate focal length state (f=35.2), and FIG. 16C is in a telephoto end state (f=53.4).

As is apparent from the respective graphs, the optical system according to Example 8 shows superb optical performance as a result of good corrections to various aberrations in the wide-angle end state, in the intermediate focal length state, and in the telephoto end state.

EXAMPLE 9

FIG. 17 is a sectional view showing a lens configuration of an optical system according to Example 9 of the present application.

The optical system according to Example 9 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object. The negative meniscus lens L11 is an aspherical lens that a resin layer is applied on an image side glass surface and formed an aspherical surface thereon.

The second lens group G2 is composed of, in order from the object, a cemented lens constructed by a negative meniscus lens L21 having a convex surface facing the object cemented with a double convex positive lens L22, and a positive meniscus lens L23 having a convex surface facing the object.

The third lens group G3 is composed of a cemented lens constructed by, in order from the object, a positive meniscus lens L31 having a concave surface facing the object cemented with a double concave negative lens L32.

The fourth lens group G4 is composed of, in order from the object, a plano-convex positive lens L41 having a plane surface facing the object, and a cemented lens constructed by a double convex positive lens L42 cemented with a negative meniscus lens L43 having a concave surface facing the object.

In the above-described optical system according to Example 9, varying a focal length from a wide-angle end state to a telephoto end state is carried out by varying a distance between the first lens group G1 and the second lens group G2, increasing a distance between the second lens group G2 and the third lens group G3, and decreasing a distance between the third lens group G3 and the fourth lens group G4.

In the optical system according to Example 9, an aperture stop S is disposed to the object side of the third lens group G3, and moved together with the third lens group G3 upon varying a focal length from the wide-angle end state to the telephoto end state.

In the optical system according to Example 9, focusing from an infinity object to a close object is carried out by moving the first lens group G1.

In the optical system according to Example 9, the positive meniscus lens L13 in the first lens group G1 is an A lens. Since the A lens is disposed to the object side of the aperture stop S, the A lens has a meniscus shape having a convex surface facing the object, so that an incident angle of an oblique ray not parallel to the optical axis onto the A lens becomes close to the normal.

Various values associated with the optical system according to Example 9 are listed in Table 9.

TABLE 9

[Lens Data]

| i | r | d | nd | νd |
|---|---|---|---|---|
| 1 | 120.5277 | 1.90 | 1.51680 | 64.1 |
| 2 | 15.4284 | 0.17 | 1.55389 | 38.1 |
| 3* | 13.3450 | 10.00 | | |
| 4 | −203.2133 | 1.50 | 1.62299 | 58.2 |
| 5 | 70.4202 | 1.10 | | |
| 6 | 27.2078 | 3.10 | 2.14352 | 17.8 |
| 7 | 33.0380 | d7 | | |
| 8 | 34.2985 | 0.90 | 1.84666 | 23.8 |
| 9 | 17.9810 | 4.20 | 1.51823 | 58.9 |
| 10 | −30.6254 | 0.10 | | |
| 11 | 19.4154 | 1.90 | 1.51823 | 58.9 |
| 12 | 38.9724 | d12 | | |
| 13 | ∞ | 2.90 | Aperture Stop S | |
| 14 | −37.8261 | 2.75 | 1.85026 | 32.4 |
| 15 | −10.7739 | 0.80 | 1.80400 | 46.6 |
| 16 | 86.6088 | d16 | | |
| 17 | ∞ | 3.20 | 1.51823 | 58.9 |
| 18 | −25.3312 | 0.10 | | |
| 19 | 140.4429 | 5.20 | 1.48749 | 70.5 |
| 20 | −16.6752 | 1.30 | 1.85026 | 32.4 |
| 21 | −40.5396 | Bf | | |

[Aspherical Data]
Surface Number: 3

| κ = | 0.0000 |
|---|---|

TABLE 9-continued

| A3 = | +0.0000 |
|---|---|
| A4 = | +2.4722E−05 |
| A6 = | +7.9219E−08 |
| A8 = | −1.4112E−10 |
| A10 = | +8.5922E−13 |
| A12 = | +0.0000 |

| | W | M | T |
|---|---|---|---|
| [Specifications] | | | |
| Zoom Ratio: 2.89 | | | |
| f | 18.5 | 35.2 | 53.4 |
| FNO | 3.7 | 5.0 | 5.9 |
| 2ω | 78.0 | 44.2 | 29.8 |
| Y | 14.25 | 14.25 | 14.25 |
| TL | 132.19 | 125.64 | 136.24 |
| Bf | 38.51 | 54.61 | 72.69 |
| [Variable Distances] | | | |
| d7 | 33.78 | 11.13 | 3.66 |
| d12 | 2.43 | 7.79 | 12.02 |
| d16 | 16.35 | 10.99 | 6.76 |
| d21(Bf) | 38.51 | 54.61 | 72.69 |

[Lens Group Data]

| Group | i | focal length |
|---|---|---|
| 1 | 1 | −25.15 |
| 2 | 8 | 27.16 |
| 3 | 14 | −36.09 |
| 4 | 17 | 43.20 |

[Values for Conditional Expressions: (L13)]

| (1): nA − 0.00250νA = | 2.09910 |
|---|---|
| (2): nA − 0.33750νA = | −3.85385 |
| (3): (r2 + r1)/(r2 − r1) = | 10.33 |
| (4): (r2 + r1)/(r2 − r1) = | 10.33 |
| (5): fA/fG = | −4.18 |

Figure 18A:
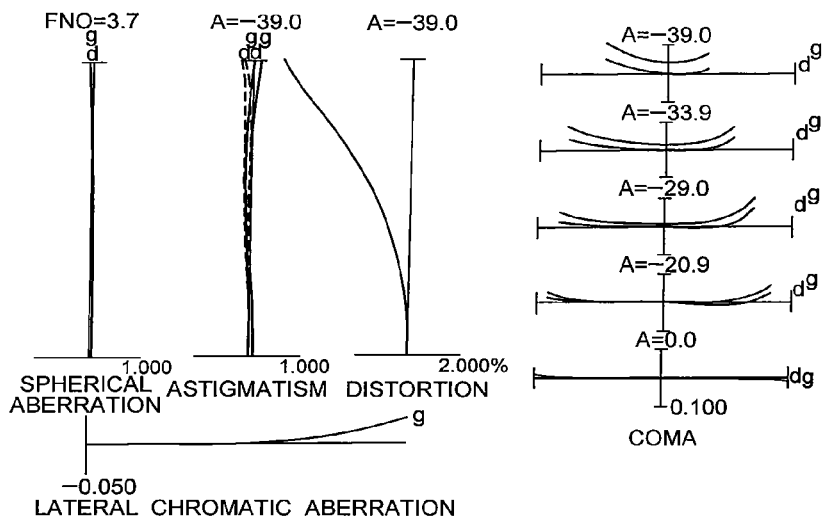
Figure 18B:
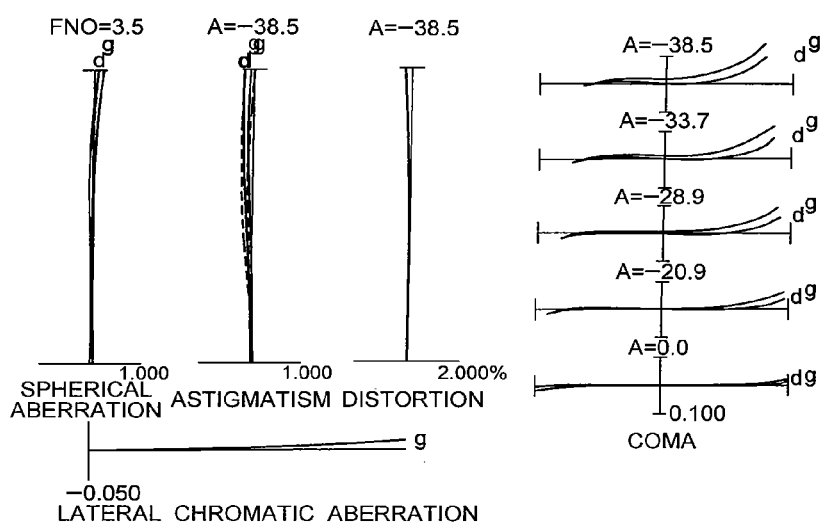
Figure 18C:
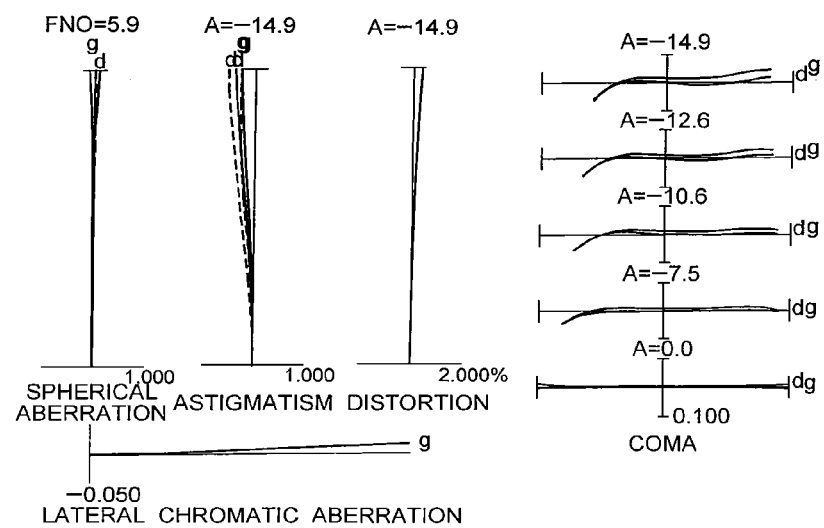

FIGS. 18A, 18B and 18C are graphs showing various aberrations of the optical system according to Example 9 upon focusing on infinity, in which FIG. 4A is in a wide-angle end state (f=18.5), FIG. 4B is in an intermediate focal length state (f=35.2), and FIG. 4C is in a telephoto end state (f=53.4).

As is apparent from the respective graphs, the optical system according to Example 9 shows superb optical performance as a result of good corrections to various aberrations in the wide-angle end state, in the intermediate focal length state, and in the telephoto end state.

EXAMPLE 10

Figure 19:
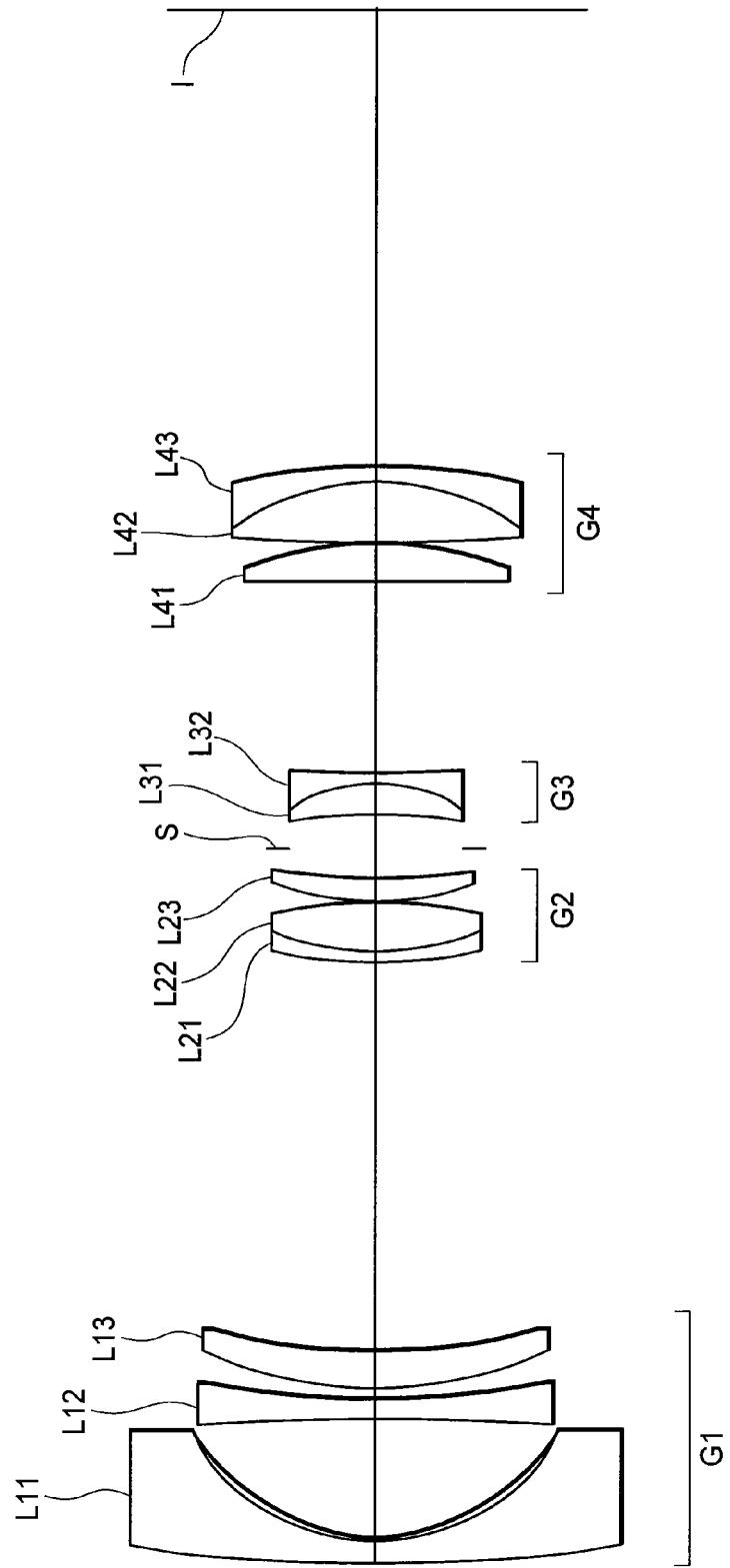
FIG. 19 is a sectional view showing a lens configuration of an optical system according to Example 10 of the present application.

FIG. 19 is a sectional view showing a lens configuration of an optical system according to Example 10 of the present application.

The optical system according to Example 10 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object. The negative meniscus lens L11 is an aspherical lens that a resin layer is applied on an image side glass surface and formed an aspherical surface thereon.

The second lens group G2 is composed of, in order from the object, a cemented lens constructed by a negative meniscus lens L21 having a convex surface facing the object cemented with a double convex positive lens L22, and a positive meniscus lens L23 having a convex surface facing the object.

The third lens group G3 is composed of a cemented lens constructed by, in order from the object, a positive meniscus lens L31 having a concave surface facing the object cemented with a double concave negative lens L32.

The fourth lens group G4 is composed of, in order from the object, a plano-convex positive lens L41 having a plane surface facing the object, and a cemented lens constructed by a double convex positive lens L42 cemented with a negative meniscus lens L43 having a concave surface facing the object.

In the optical system according to Example 10, an aperture stop S is disposed to the object side of the third lens group G3.

In the optical system according to Example 10, focusing from an infinity object to a close object is carried out by moving the first lens group G1.

In the optical system according to Example 10, the positive meniscus lens L13 in the first lens group G1 is an A lens. Since the A lens is disposed to the object side of the aperture stop S, the A lens has a meniscus shape having a convex surface facing the object, so that an incident angle of an oblique ray not parallel to the optical axis onto the A lens becomes close to the normal.

Various values associated with the optical system according to Example 10 are listed in Table 10.

TABLE 10

[Lens Data]

| i | r | d | nd | νd |
|---|---|---|---|---|
| 1 | 123.1562 | 1.90 | 1.51680 | 64.1 |
| 2 | 15.5000 | 0.17 | 1.55389 | 38.1 |
| 3* | 13.3000 | 10.00 | | |
| 4 | −183.9004 | 1.50 | 1.62299 | 58.2 |
| 5 | 53.4327 | 1.10 | | |
| 6 | 29.8607 | 3.10 | 2.00170 | 20.7 |
| 7 | 44.5512 | 32.95 | | |
| 8 | 34.0508 | 0.90 | 1.84666 | 23.8 |
| 9 | 18.0131 | 4.20 | 1.51823 | 58.9 |
| 10 | −30.6255 | 0.10 | | |
| 11 | 19.8978 | 1.90 | 1.51823 | 58.9 |
| 12 | 40.4509 | 2.50 | | |
| 13 | ∞ | 2.90 | Aperture Stop S | |
| 14 | −36.2369 | 2.75 | 1.85026 | 32.4 |
| 15 | −10.7239 | 0.80 | 1.80400 | 46.6 |
| 16 | 96.3187 | 16.46 | | |
| 17 | ∞ | 3.20 | 1.51823 | 58.9 |
| 18 | −24.2955 | 0.10 | | |
| 19 | 138.8999 | 5.20 | 1.48749 | 70.5 |
| 20 | −16.5664 | 1.30 | 1.85026 | 32.4 |
| 21 | −42.2488 | Bf | | |

[Aspherical Data]
Surface Number: 3

| | |
|---|---|
| κ = | 0.0000 |
| A3 = | +0.0000 |
| A4 = | +2.4776E−05 |
| A6 = | +7.6999E−08 |
| A8 = | −1.4364E−10 |
| A10 = | +9.0560E−13 |
| A12 = | +0.0000 |

[Specifications]

| | |
|---|---|
| f | 18.5 |
| FNO | 3.7 |
| 2ω | 78.0 |
| Y | 14.25 |
| TL | 131.37 |
| Bf | 38.35 |

TABLE 10-continued

[Values for Conditional Expressions: (L13)]

| | |
|---|---|
| (1): nA − 0.00250νA = | 1.95020 |
| (2): nA − 0.33750νA = | −4.95080 |
| (3): (r2 + r1)/(r2 − r1) = | 5.07 |
| (4): (r2 + r1)/(r2 − r1) = | 5.07 |
| (5): fA/fG = | −3.25 |

Figure 20:
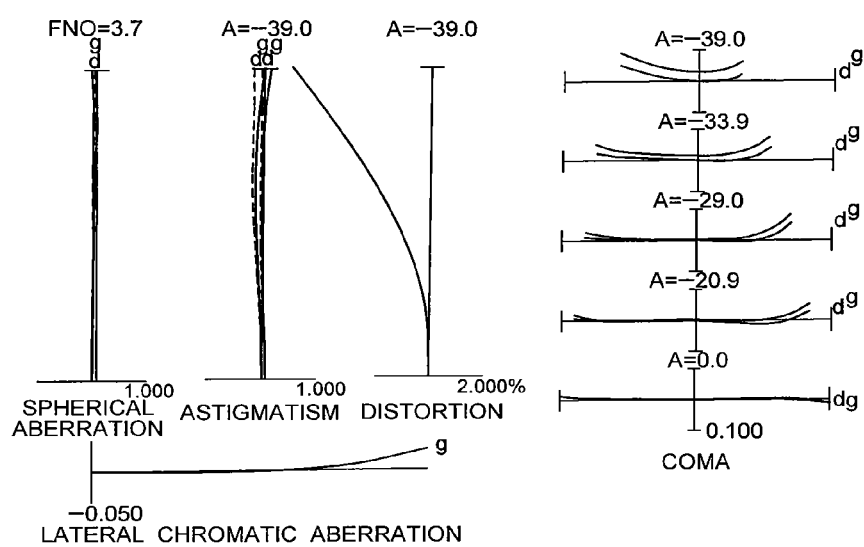
FIG. 20 is graphs showing various aberrations of the optical system according to Example 10 upon focusing on an infinity object (f=18.5).

FIG. 20 is graphs showing various aberrations of the optical system according to Example 10 upon focusing on infinity (f=18.5).

As is apparent from the respective graphs, the optical system according to Example 10 shows superb optical performance as a result of good corrections to various aberrations.

As described above, with setting a high refractive index and an Abbe number of a medium in appropriate ranges, each Example makes it possible to realize an optical system having excellent optical performance with sufficiently correcting spherical aberration and curvature of field.

Although optical systems with a two-lens-group configuration, a three-lens-group configuration and a four-lens-group configuration are shown as respective Examples of the present application, lens configuration of the optical system according to the present application is not limited to this, and other lens-group configurations such as a five-lens-group configuration can be applied.

In the present optical system, in order to focusing from an infinity object to a close object, a portion of a lens group or a lens group may be moved along an optical axis as a focusing lens group. The focusing lens group may be used for an auto focus, and is suitable for being driven by a motor such as an ultrasonic motor. In particular in the optical system according to the present application, it is preferable that the first lens group or a portion of the first lens group is used as the focusing lens group.

In each Example described above, a lens group or a portion of a lens group may be shifted in a direction perpendicular to the optical axis as a vibration reduction lens group in order to correct an image blur caused by a camera shake, a lens group or a portion of a lens group of the other lens groups may be used as a vibration reduction lens group. In an optical system according to the present application, it is particularly preferable that a portion of the second lens group or a portion of the third lens group is used as a vibration reduction lens group.

Moreover, in an optical system according to the present application, with using an aspherical lens in the first lens group, correction of aberrations such as spherical aberration and curvature of field is effectively carried out. However, an aspherical lens may be used in other than the second lens group. The aspherical surface may be fabricated by a fine grinding process, a glass molding process that a glass material is formed into an aspherical shape by a mold, or a compound type process that a resin material is formed into an aspherical shape on a glass surface.

An antireflection coating having high transmittance over a broad wavelength range may be applied to each lens surface of an optical system according to the present application to reduce flare or ghost images, so that high optical performance with a high contrast can be attained.

In an optical system according to the present application, a diffractive optical element may be easily used. With this configuration, it becomes possible to excellently correct chromatic aberration The present embodiment only shows a specific example for the purpose of better understanding of the present invention.

Accordingly, it is needless to say that the invention in its broader aspect is not limited to the specific details and representative devices.

Then, a camera equipped with an optical system according to the present application is explained below with reference to FIG. 21.

Figure 21:
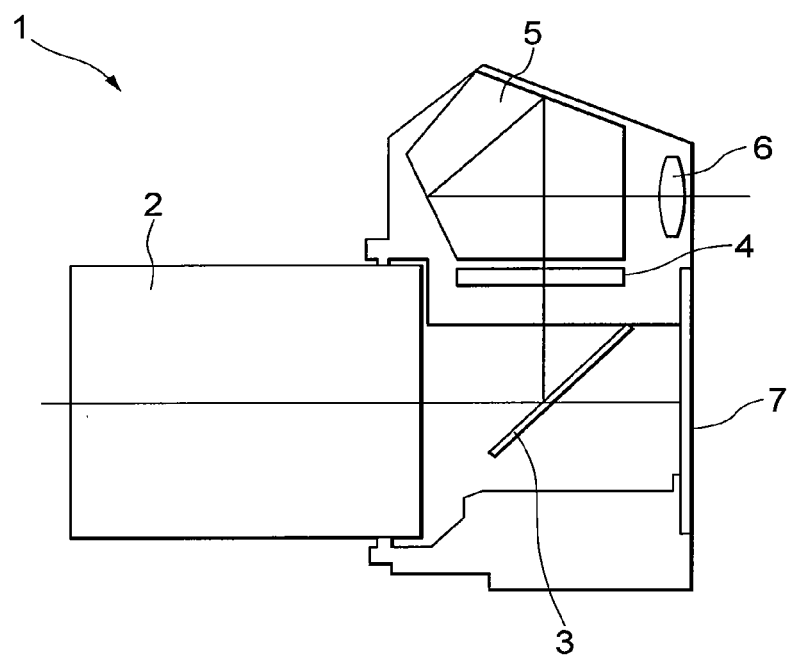
FIG. 21 is a graph showing a camera equipped with the optical system according to Example 1 of the present application.

FIG. 21 is a schematic diagram showing a camera equipped with the optical system according to Example 1 of the present application.

As shown in FIG. 21, the camera 1 is a single-lens reflex digital camera equipped with the zoom lens system according to Example 1 as an image-taking lens 2.

In the camera 1, light emitted from an object (not shown) is converged by the image-taking lens 2, and focused on a focusing screen 4 through a quick return mirror 3. The object image focused on the focusing screen 4 is reflected a plurality of times by a pentagonal roof prism 5, and led to an eyepiece 6. Therefore, a photographer can observe the object image as an erected image through the eyepiece 6.

When the photographer presses a shutter release button (not shown), the quick return mirror 3 is removed from an optical path, and the light from the object (not shown) reaches an imaging device 7. Accordingly, light from the object is captured by the imaging device 7 and stored in a memory (not shown) as the object image. In this manner, the photographer can take a picture of the object by the camera 1.

The optical system according to Example 1 of the present embodiment attached to the camera 1 as an image-taking lens 2 makes it possible to realize excellent optical performance with sufficiently correcting spherical aberration and curvature of field by means of the specific lens configuration. Accordingly, the camera 1 makes it possible to realize excellent optical performance with sufficiently correcting spherical aberration and curvature of field.

It is needless to say that the same result as the camera 1 described above is obtained by constructing a camera equipped with the optical system according to any of Examples 2 through 10 as an image-taking lens 2.

As described above, it becomes possible to provide an optical system having excellent optical performance, an imaging apparatus, and a method for forming an image by the optical system.

What is claimed is:

1. An optical system comprising:
    a plurality of lens groups;
    at least one of the plurality of lens groups having an A lens that satisfies at least one of the following conditional expressions:

$1.88900 < nA - 0.00250\nu A$ $-4.27500 < nA - 0.3375\nu A$ where nA denotes a refractive index of the A lens at d-line in which wavelength λ=587.6 nm, and νA denotes an Abbe number of the A lens at d-line in which wavelength λ=587.6 nm,
        wherein the plurality of lens groups include, in order from the most object side, a first lens group having negative refractive power, and a second lens group having positive refractive power, and
        upon zooming a distance between the first lens group and the second lens group varies.

2. The optical system according to claim 1, wherein the plurality of lens groups include a third lens group having negative refractive power.

3. The optical system according to claim 1, wherein the A lens satisfies the following conditional expression:

$3.67 < (r2+r1)/(r2-r1)$ where r1 denotes a radius of curvature of the object side surface of the A lens, and r2 denotes a radius of curvature of the image side surface of the A lens.

4. The optical system according to claim 1, wherein the A lens satisfies the following conditional expression:

$(r2+r1)/(r2-r1) < -2.08$ where r1 denotes a radius of curvature of the object side surface of the A lens, and r2 denotes a radius of curvature of the image side surface of the A lens.

5. The optical system according to claim 1, wherein the A lens satisfies the following conditional expression:

$-4.50 < fA/fG < -0.10$ where fA denotes a focal length of the A lens, and fG denotes a focal length of the lens group in which the A lens is included.

6. The optical system according to claim 1, wherein the A lens has positive refractive power.

7. The optical system according to claim 1, further comprising an aperture stop, wherein the A lens is disposed to the object side of the aperture stop, and has a convex surface facing the object.

8. The optical system according to claim 1, further comprising an aperture stop, wherein the A lens is disposed to the image side of the aperture stop, and has a concave surface facing the object.

9. The optical system according to claim 1, wherein among the plurality of lens groups, the lens group that includes the A lens has negative refractive power.

10. The optical system according to claim 1, wherein the most object side lens group in the plurality of lens groups has an aspherical lens.

11. The optical system according to claim 1, wherein varying a focal length from a wide-angle end state to a telephoto end state is carried out by varying each distance between the plurality of lens groups.

12. The optical system according to claim 1, wherein among the plurality of lens groups, the lens group that includes the A lens is composed of two lenses or less.

13. An imaging apparatus equipped with the optical system according to claim 1.

14. A method for forming an image of an object by an optical system comprising steps of:
    providing the optical system including a plurality of lens groups that include, in order from the most object side, a first lens group having negative refractive power, and a second lens group having positive refractive power, and including an A lens in at least one of the plurality of lens groups, the A lens satisfying at least one of the following conditional expressions:

$1.88900 < nA - 0.00250\nu A$ $-4.27500 < nA - 0.3375\nu A$ where nA denotes a refractive index of the A lens at d-line in which wavelength λ=587.6 nm, and νA denotes an Abbe number of the A lens at d-line in which wavelength λ=587.6 nm, and
    disposing the first lens group and the second lens group so that, upon zooming, a distance between the first lens group and the second lens group varies.

15. The method according to claim 14, wherein the plurality of lens groups include a third lens group having negative refractive power.

16. The method according to claim 14, wherein the A lens satisfies the following conditional expression:

$$-4.50 < fA/fG < -0.10$$

where fA denotes a focal length of the A lens, and fG denotes a focal length of the lens group in which the A lens is included.

17. The method according to claim 14, wherein the A lens has positive refractive power.

* * * * *